United States Patent
Ryu et al.

(10) Patent No.: US 10,227,813 B2
(45) Date of Patent: Mar. 12, 2019

(54) DEVICE AND METHOD FOR OPENING TRUNK OF VEHICLE, AND RECORDING MEDIUM FOR RECORDING PROGRAM FOR EXECUTING METHOD

(71) Applicant: LG INNOTEK CO., LTD., Seoul (KR)

(72) Inventors: Seung Hun Ryu, Seoul (KR); Jeong Woo Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 156 days.

(21) Appl. No.: 15/119,343

(22) PCT Filed: Feb. 10, 2015

(86) PCT No.: PCT/KR2015/001345
§ 371 (c)(1),
(2) Date: Aug. 16, 2016

(87) PCT Pub. No.: WO2015/122677
PCT Pub. Date: Aug. 20, 2015

(65) Prior Publication Data
US 2017/0009509 A1    Jan. 12, 2017

(30) Foreign Application Priority Data
Feb. 17, 2014  (KR) .................... 10-2014-0018102

(51) Int. Cl.
*E05F 15/73* (2015.01)
*E05F 15/77* (2015.01)
(Continued)

(52) U.S. Cl.
CPC ............ *E05F 15/73* (2015.01); *B60R 16/023* (2013.01); *B60R 25/2045* (2013.01);
(Continued)

(58) Field of Classification Search
CPC ... B60R 16/023; B60R 25/2045; B62D 25/10; E05F 15/73; E05F 15/77;
(Continued)

(56) References Cited

U.S. PATENT DOCUMENTS 5,001,557 A    3/1991  Begle
2005/0168322 A1  8/2005 Appenrodt et al.
(Continued)

FOREIGN PATENT DOCUMENTS

CN    101408936 A    4/2009
CN    102055925 A    5/2011
(Continued)

*Primary Examiner* — Charles J Han
(74) *Attorney, Agent, or Firm* — Birch, Stewart, Kolasch & Birch, LLP

(57) ABSTRACT

A vehicle trunk opening device including an approach checking unit which checks whether a user approaches a trunk of a vehicle and outputs the checked result as an access signal; a movement information acquisition unit for acquiring movement information of the user by responding to an acquisition control signal generated when the vehicle is stationary; a movement analysis unit which analyzes whether the user's movement corresponds to a desired target movement of opening a trunk through the acquired movement information, and which outputs the analyzed result; a trunk opening unit for opening the trunk by responding to an opening control signal; and a main control unit which generates the acquisition control signal by responding to the access signal, and which generates the opening control signal by responding to the analyzed result.

12 Claims, 19 Drawing Sheets

(51) Int. Cl.
*B60W 50/08* (2012.01)
*B60W 50/10* (2012.01)
*B62D 25/10* (2006.01)
*B60R 25/20* (2013.01)
*B60R 16/023* (2006.01)

(52) U.S. Cl.
CPC .......... *B60R 25/2054* (2013.01); *B60W 50/08* (2013.01); *B60W 50/10* (2013.01); *B62D 25/10* (2013.01); *E05F 15/77* (2015.01); *E05F 2015/765* (2015.01); *E05F 2015/767* (2015.01); *E05Y 2400/44* (2013.01); *E05Y 2400/45* (2013.01); *E05Y 2400/858* (2013.01); *E05Y 2900/548* (2013.01)

(58) Field of Classification Search
CPC .......... E05F 2015/765; E05F 2015/767; E05Y 2400/44; E05Y 2400/45; E05Y 2400/858; E05Y 2900/548
See application file for complete search history.

(56) References Cited

U.S. PATENT DOCUMENTS

| | | |
|---|---|---|
| 2011/0242303 A1 | 10/2011 | Giraud et al. |
| 2013/0151084 A1 | 6/2013 | Lee |
| 2013/0200995 A1* | 8/2013 | Muramatsu ............ B60R 25/24 340/5.51 |
| 2014/0022052 A1* | 1/2014 | Lim ...................... G08C 17/02 340/5.61 |
| 2014/0118111 A1* | 5/2014 | Saladin .................. E05F 15/77 340/7.51 |

FOREIGN PATENT DOCUMENTS

| | | |
|---|---|---|
| CN | 102892228 A | 1/2013 |
| CN | 103569211 A | 2/2014 |
| JP | 2003-253940 A | 9/2003 |
| JP | 2008-296777 A | 12/2008 |
| JP | 2010-76483 A | 4/2010 |
| JP | 2010-236184 A | 10/2010 |
| JP | 2012-172367 A | 9/2012 |
| JP | 2013-117134 A | 6/2013 |
| KR | 10-0887688 B1 | 3/2009 |
| KR | 10-2013-0058913 A | 6/2013 |
| KR | 10-2013-0066348 A | 6/2013 |
| WO | WO 02/44505 A1 | 6/2002 |
| WO | WO 2010/037821 A1 | 4/2010 |
| WO | WO 2013/018333 A1 | 2/2013 |
| WO | WO 2013/026529 A1 | 2/2013 |
| WO | WO 2014/188661 A1 | 11/2014 |

\* cited by examiner

DEVICE AND METHOD FOR OPENING TRUNK OF VEHICLE, AND RECORDING MEDIUM FOR RECORDING PROGRAM FOR EXECUTING METHOD

CROSS REFERENCE TO RELATED APPLICATIONS

This application is the National Phase of PCT/KR2015/001345 filed on Feb. 10, 2015, which claims the priority under 35 U.S.C. § 119(a) to Patent Application No. 10-2014-0018102, filed in the Republic of Korea on Feb. 17, 2014, all of which are hereby expressly incorporated by reference into the present application.

TECHNICAL FIELD

Embodiments relate to a device and method for opening the trunk of a vehicle and a recording medium for recording program performing the method.

BACKGROUND ART

Generally, in order to open the trunk of a vehicle, a user of the vehicle presses a trunk open button provided in a driver's seat or a button provided on a vehicle key, or directly inserts the vehicle key into a keyhole formed in the trunk.

If the user of the vehicle holds a heavy object or has a physical handicap, however, it may be difficult to press the trunk open button or to directly insert the vehicle key into the keyhole. In particular, the user must take out the vehicle key, which is troublesome.

Meanwhile, hand-free trunk opening products that open the trunk using the foot require a capacity sensor or a passive infrared sensor in addition to a rear camera, which increases cost.

DISCLOSURE

Technical Problem

Embodiments provide a device and method for easily opening the trunk of a vehicle without error through the motion of a user of the vehicle and a recording medium for recording a program performing the method.

Technical Solution

In one embodiment, a device for opening a trunk of a vehicle may include an approach determination unit for determining whether a user has approached the trunk of the vehicle and outputting the result of determination as an approach signal, a motion information acquisition unit for acquiring information about motion of the user in response to an acquisition control signal, a motion analysis unit for analyzing the acquired motion information to determine whether the user's motion is intentional motion performed with an intent of opening the trunk and outputting the result of analysis, a trunk opening unit for opening the trunk in response to an opening control signal, and a main controller for generating the acquisition control signal in response to the approach signal and generating the opening control signal in response to the result of analysis.

The approach determination unit may include an authentication and location recognition unit for authenticating the user and recognizing the location of the user through wireless communication with a wireless communication unit held by the user, a distance calculation unit for calculating the separation distance between the trunk and the user based on the recognized location, and a distance comparison unit for comparing the calculated separation distance with a critical distance and outputting the result of comparison as an approach signal.

The wireless communication unit may be included in a smart key.

The motion information acquisition unit may include an image photographing unit for photographing the state in front of the trunk that does not contain the user's motion in response to a first level acquisition control signal and outputting the photographed image as a first image and photographing the state in front of the trunk that contains the user's motion in response to a second level acquisition control signal and outputting the photographed image as a second image, and an image difference generation unit for outputting a motion image, which is the difference between the second image and the first image, as the user's motion information. The main controller may generate the first level acquisition control signal upon determining that the user, having approached the trunk, is not yet located in front of the trunk based on the approach signal, and may generate the second level acquisition control signal upon determining that the user, having approached the trunk, is located in front of the trunk based on the approach signal.

The image photographing unit may acquire the first and second images using at least one selected from between infrared light and visible light.

The motion information acquisition unit may further include a light emitting unit for emitting light in response to a light emission control signal, an illumination sensing unit for sensing illumination intensity around the trunk, and a lighting control unit for generating the light emission control signal in response to the sensed illumination intensity.

The motion information acquisition unit may include a signal transmission unit for transmitting a signal toward the front of the trunk in response to the acquisition control signal, a signal reception unit for receiving a signal reflected by the body of the user, and a signal processing unit for processing the transmitted signal and the received signal to acquire the user's motion information. The signal may include an infrared signal or an ultrasonic signal.

The motion analysis unit may include a change rate calculation unit for calculating the change rate of the user's motion based on the motion image and a change rate comparison unit for comparing the calculated change rate with a critical change rate and outputting the result of comparison to the main controller as the result of analysis.

The motion analysis unit may measure the period during which the user, having approached at least one certain point of the trunk, stays in place, may determine whether the measured period exceeds a critical period, and may output the result of determination to the main controller as the result of analysis.

The motion analysis unit may include a movement information acquisition unit for acquiring information about movement of the user based on the user's motion information received from the motion information acquisition unit and a motion comparison unit for comparing the user's motion with the intentional motion in consideration of the movement information and outputting the result of comparison as the result of analysis.

The movement information may include at least one selected from among whether the user is stationary, the speed of the user's movement, the speed at which the user approaches the at least one certain point, the direction of the user's movement, and the speed at which the user approaches at least one certain point of the trunk.

The device may further include a stationary state determination unit for determining whether the vehicle is stationary, wherein the main controller may generate the acquisition control signal and the opening control signal in response to the result of determination.

The stationary state determination unit may include an engine checking unit for checking whether the engine of the vehicle is running and determining whether the vehicle is stationary based on the result of checking.

The stationary state determination unit may include a gear change lever position checking unit for checking the position of a gear change lever of the vehicle and determining whether the vehicle is stationary based on the result of checking.

The image photographing unit and the image difference generation unit may be included in a single module.

The device may further include a power supply unit for supplying power to the motion information acquisition unit and the motion analysis unit in response to a first power control signal, wherein the main controller may generate the first power control signal in response to the approach signal.

The power supply unit may supply power to the stationary state determination unit in response to a second power control signal, and the main controller may generate the second power control signal in response to the approach signal.

In another embodiment, a method of opening a trunk of a vehicle includes (a) determining whether a user has approached the trunk of the vehicle, (b) acquiring information about motion of the user upon determining that the user has approached the trunk, (c) analyzing the motion information to determine whether the user's motion is intentional motion performed with the intent of opening the trunk, and (d) opening the trunk upon determining that the user's motion is the intentional motion.

Step (a) may include authenticating the user and recognizing the location of the user through wireless communication with a wireless communication unit held by the user, calculating the separation distance between the trunk and the user based on the recognized location, and determining whether the separation distance is equal to or less than a critical distance, and step (b) may be performed upon determining that the separation distance is equal to or less than the critical distance.

The method may further include informing the user that the trunk cannot be opened upon determining that the user's motion is not the intentional motion.

Step (b) may include photographing the state in front of the trunk that does not contain the user's motion and acquiring the photographed image as a first image when the user, having approached the trunk, is not yet located in front of the trunk and photographing the state in front of the trunk that contains the user's motion and acquiring the photographed image as a second image when the user, having approached the trunk, is located in front of the trunk, and acquiring the difference between the first image and the second image as a motion image, and step (c) may include determining whether the user's motion is intentional motion using the motion image.

Step (b) may further include sensing illumination intensity around the trunk and turning on or off a light emitting unit for emitting light toward the front of the trunk based on the sensed illumination intensity.

The first and second images may be images photographed using at least one selected from between infrared light and visible light.

Step (b) may include transmitting a signal toward the front of the trunk, receiving a signal reflected by the body of the user, and processing the transmitted signal and the received signal to acquire the user's motion information. The signal may include an infrared signal or an ultrasonic signal.

Step (c) may include (c1) calculating the change rate of the user's motion based on the motion image and (c2) determining whether the calculated change rate is equal to or greater than a critical change rate, and step (d) may include opening the trunk upon determining that the calculated change rate is equal to or greater than the critical change rate.

The change rate calculated at step (c1) may include the change rate of a pixel luminance level between adjacent frames, among a plurality of frames in the motion image.

Step (c1) may include calculating the change rate of the luminance level of a plurality of pixels in a center area of each of the frames as a first position luminance change rate and calculating the change rate of the luminance level of a plurality of pixels in a peripheral area of each of the frames as a second position luminance change rate, and step (c2) may include comparing the first and second position luminance change rate with the critical change rate.

Step (c) may include measuring the period during which the user, having approached at least one certain point of the trunk, stays in place based on the acquired motion information and determining whether the measured period exceeds a critical period, and step (d) may include opening the trunk upon determining that the measured period does not exceed the critical period.

The at least one certain point may be at least one selected from among the position of a camera for acquiring the first and second images, the position of an illumination sensor for sensing the illumination intensity, the position of the light emitting unit, and the position of a keyhole of the trunk.

Step (c) may include acquiring user's movement information based on the acquired motion information. It may be determined whether the user's motion is the intentional motion by referring to the movement information.

The movement information may include at least one selected from among whether the user is stationary, the speed of the user's movement, the speed at which the user approaches the at least one certain point, the direction of the user's movement, and the speed at which the user approaches at least one certain point of the trunk.

The method may further include determining whether the vehicle is stationary.

Upon determining that the vehicle is stationary, steps (a), (b), (c), or (d) may be performed.

The step of determining whether the vehicle is stationary may include checking whether an engine of the vehicle is running and determining whether the vehicle is stationary based on the result of checking.

The step of determining whether the vehicle is stationary may include checking the position of a gear change lever of the vehicle and determining whether the vehicle is stationary based on the result of checking.

In a further embodiment, a recording medium recording a program for executing a vehicle trunk opening method performed by a vehicle trunk opening device including an approach determination unit, a motion information acquisition unit, and a trunk opening unit, is configured to record a program for realizing a function of determining whether the user has approached the trunk of the vehicle through the approach determination unit, a function of acquiring information about motion of the user through the motion information acquisition unit upon determining that the user has approached the trunk, a function of analyzing the acquired motion information to determine whether the user's motion is intentional motion performed with the intent of opening the trunk, and a function of opening the trunk through the trunk opening unit upon determining that the user's motion is the intentional motion.

The computer-readable recording medium may record a program for further realizing a function of determining whether the vehicle is stationary.

Advantageous Effects

In the vehicle trunk opening device and method according to the embodiments and the computer-readable recording medium for executing the method, it is possible to easily open the trunk of the vehicle without error through the motion of the user of the vehicle. In addition, the vehicle trunk opening device and method and computer-readable recording medium may be easily realized at low cost.

BEST MODE

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the disclosure to those skilled in the art.

In addition, relational terms, such as "first", "second", "above", and "under", are used only to distinguish between one subject or element and another subject and element without necessarily requiring or involving any physical or logical relationship or sequence between such subjects or elements.

Figure 1:
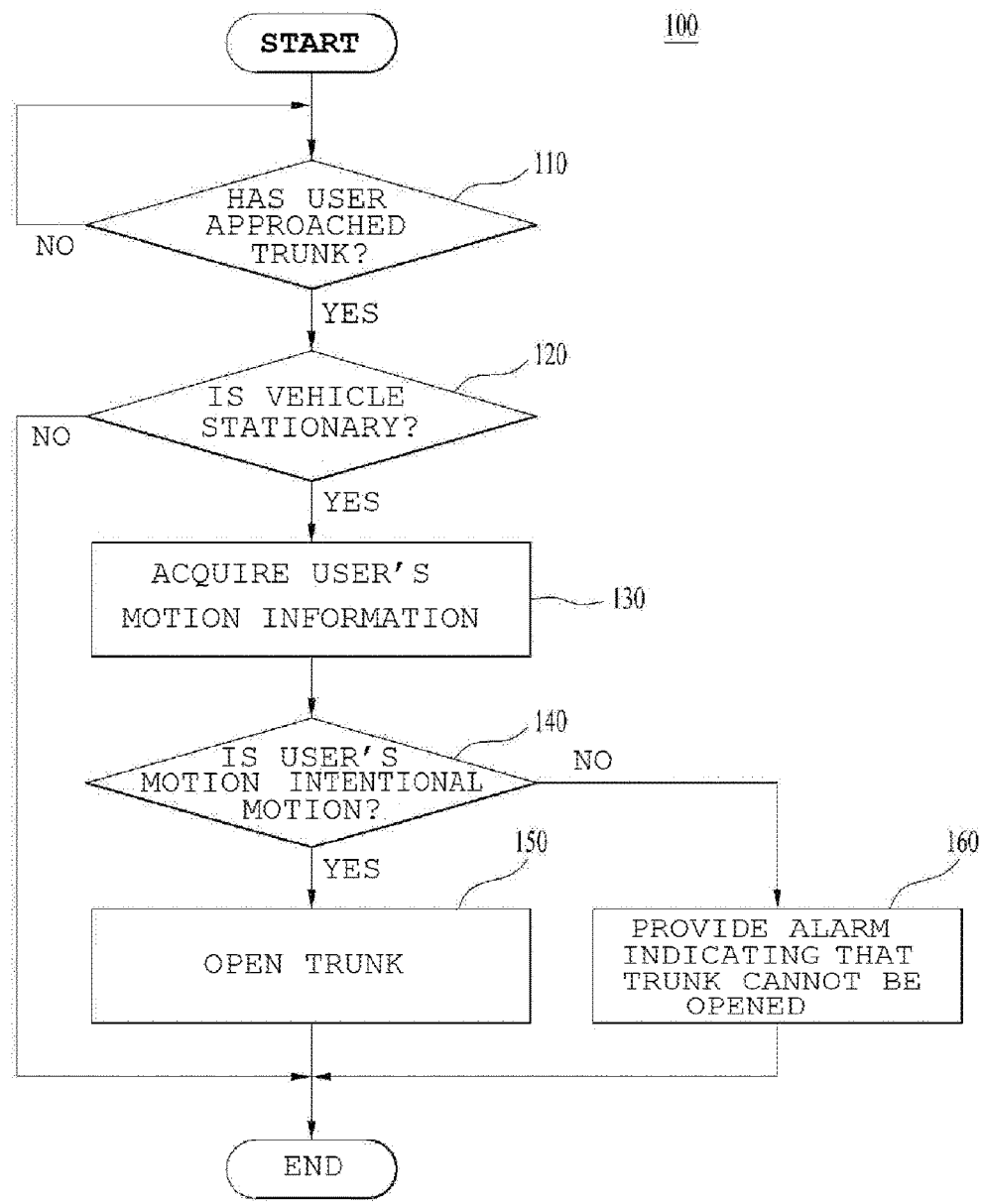
FIG. 1 is a flowchart illustrating a vehicle trunk opening method according to an embodiment.

FIG. 1 is a flowchart illustrating a vehicle trunk opening method 100 according to an embodiment.

Referring to FIG. 1, the vehicle trunk opening method 100 according to the embodiment includes steps (Step 110 to Step 130) of acquiring information about a user's motion (hereinafter, referred to as 'user's motion information') when a user approaches the trunk in the state in which the vehicle is stationary and steps (Step 140 to Step 160) of opening the trunk or informing the user that the trunk cannot be opened based on the user's motion.

Here, the 'user' means a person, such as a driver or a passenger, who uses the vehicle. In particular, the user may mean a person who holds a wireless communication unit, such as a smart key, and has the authority to open the trunk.

In addition, the 'trunk' is a cargo compartment of the vehicle. For a passenger vehicle or a multi-purpose vehicle, the trunk is generally located at the rear of the vehicle. However, embodiments are not limited to the kind or size of the vehicle. Therefore, embodiments are not limited to the position or size of the trunk.

In addition, the 'user's motion' may mean a user's gesture or a user's movement. However, embodiments are not limited thereto.

Hereinafter, Step 110 to Step 160 will be described in detail with reference to FIGS. 2A and 2B for easy understanding of the vehicle trunk opening method 100 according to the embodiment shown in FIG. 1. However, the vehicle trunk opening method 100 according to the embodiment is not limited to the cases shown in FIGS. 2A and 2B.

Figure 2A:
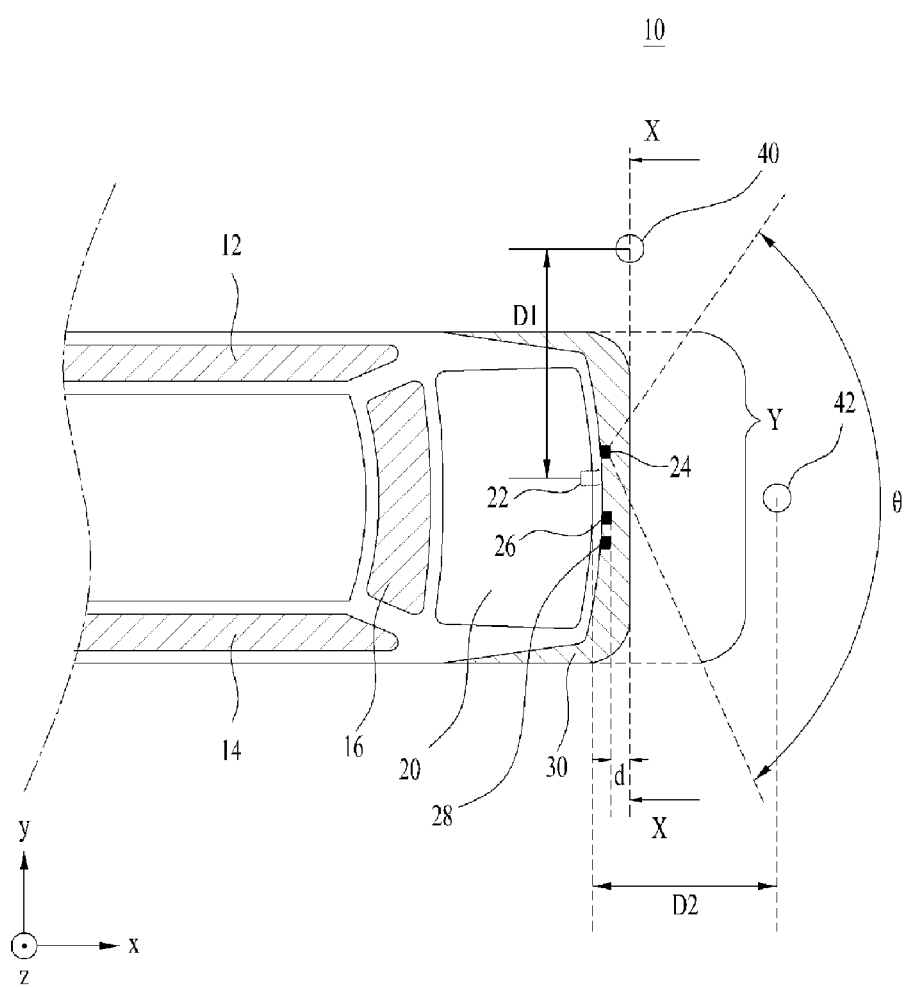
FIGS. 2a and 2b are a plan view of the vehicle when viewed from the z axis in a Cartesian coordinate system and a sectional view of the vehicle when viewed from the y axis in the Cartesian coordinate system, respectively.
Figure 2B:
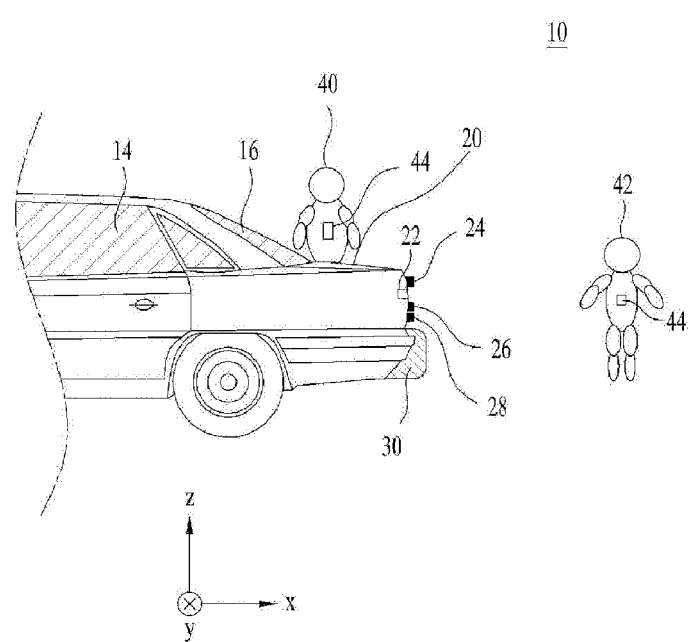

FIGS. 2A and 2B are a plan view of the vehicle 10 when viewed from the z axis in a Cartesian coordinate system and a sectional view of the vehicle 10 when viewed from the y axis in the Cartesian coordinate system, respectively. Here, reference numerals '12', '14', and '16' indicate windows of the vehicle. However, these reference numerals are merely illustrations for enabling understanding of the vehicle.

First, it is determined whether a user 40 or 42 has approached the trunk 20 of the vehicle (Step 110).

Figure 3:
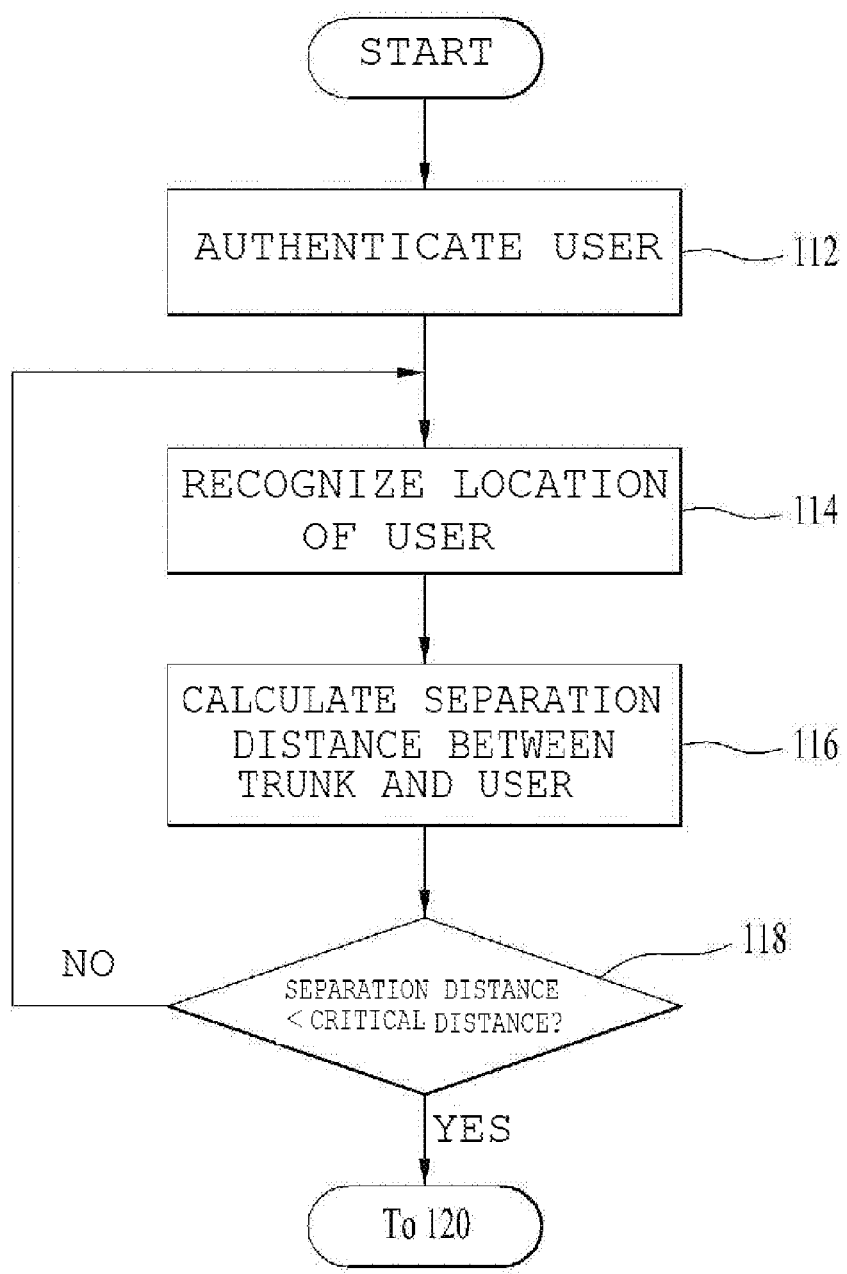
FIG. 3 is a flowchart illustrating an embodiment of Step 110 shown in FIG. 1.

FIG. 3 is a flowchart illustrating an embodiment 110 of Step 110 shown in FIG. 1.

Referring to FIG. 3, wireless communication is performed to a wireless communication unit 44 held by the user 40 or 42 to authenticate the user 40 or 42 (Step 112). The wireless communication unit 44 may be included in a general smart key (not shown) that is capable of performing wireless communication with the vehicle, or may include such a smart key. In the case in which the user holds the wireless communication unit 44, it may be determined whether the user 40 or 42 is authorized to use the vehicle.

After Step 112, the location of the authenticated user 40 or 42 is recognized (Step 114). In the case in which the user 40 or 42 holds smart keys as the wireless communication unit 44, it may be checked whether the user 40 or 42 is in the vehicle, is outside the vehicle, and is approaching the vehicle, and the distance by which the user 40 or 42 is moving away from the vehicle. In this way, it is possible to recognize the location of the user 40 or 42 holding the smart key, which serves as the wireless communication unit 44.

Referring to FIG. 2A, the location of the user 40 or 42 may be expressed as (x, y) coordinates in the Cartesian coordinate system. However, embodiments are not limited thereto. The location of the user 40 or 42 may be expressed using various coordinate systems.

After Step 114, the separation distance between the trunk 20 and the user 40 or 42 is calculated using the recognized location of the user 40 or 42 (Step 116). In order to calculate the separation distance between the trunk 20 and the user 40 or 42, a point of the trunk 20 must be set in advance as a reference point. Since it is expected that the user 40 or 42 who wishes to open the trunk 20 will approach a keyhole 22 of the trunk 20, the separation distance between the trunk 20 and the user 40 or 42 may be calculated using the keyhole 22 as the reference point. However, embodiments are not limited thereto. In other embodiments, the separation distance between the trunk 20 and the user 40 or 42 may be calculated using a corner of the trunk 20 as the reference point.

Referring to FIG. 2A, when the user 40, who is approaching the trunk 20, is not located in front of the trunk 20, the separation distance between the keyhole 22 of the trunk 20 and the user 40 becomes D1. Here, the 'front of the trunk 20' is a zone viewed from the keyhole 22 of the trunk 20. Referring to FIG. 2A, the 'front of the trunk 20' is a zone defined by X on the x axis and Y on the y axis. However, embodiments are not limited thereto. That is, in other embodiments, the front of the trunk 20 may be a zone within a photographing angle θ of a camera 24. In the following description, an image photographed by the camera 24 when the user 40, which is approaching the trunk 20, is not yet located in front of the trunk 20 is referred to as a 'first image,' and the separation distance between the user 40 and the trunk 20 at that time is referred to as a 'first separation distance.' As shown in FIGS. 2A and 2B, the camera 24 may be disposed at a portion of the lid of the trunk 20 that is opposite the user.

In addition, when the user 42, which is approaching the trunk 20, is located in front of the trunk 20, the separation distance between the keyhole 22 of the trunk 20 and the user 42 becomes D2. In the following description, an image taken by the camera 24 when the user 42, which is approaching the trunk 20, is located in front of the trunk 20 is referred to as a 'second image,' and the separation distance between the user 42 and the trunk 20 at that time is referred to as a 'second separation distance.'

The second separation distance is less than the first separation distance. The first image does not contain the user's motion, but the second image contains the user's motion.

After Step 116, it is determined whether the separation distance is equal to or less than a critical distance (Step 118). If the separation distance is equal to or less than the critical distance, the procedure advances to Step 120, at which it is determined whether the vehicle is stationary. The separation distance compared with the critical distance at Step 118 may be the first or second separation distance. In addition, a 'first critical distance' and a 'second critical distance' are used as the 'critical distance.' The setting of the first critical distance will be described hereinafter. The second critical distance is shorter than the first critical distance. For example, Step 120 may be performed when the calculated first separation distance is equal to or less than the first critical distance.

Referring back to FIG. 1, when the user 40 or 42 has approached the trunk 20, it is determined whether the vehicle is stationary (Step 120). If the vehicle is not stationary, Step 120 is performed so as not to open the trunk 20. The reason for this is that, if the trunk 20 is opened in the state in which the vehicle is moving, the driver's driving may be disturbed. For example, the trunk 20 may be opened in undesired situations by a dog, a cat, a bird, or a piece of paper or cloth floating above a road due to wind while the vehicle is moving. For this reason, the opening of the trunk 20 may be fundamentally prevented in the case in which the vehicle is not stationary.

Figure 4:
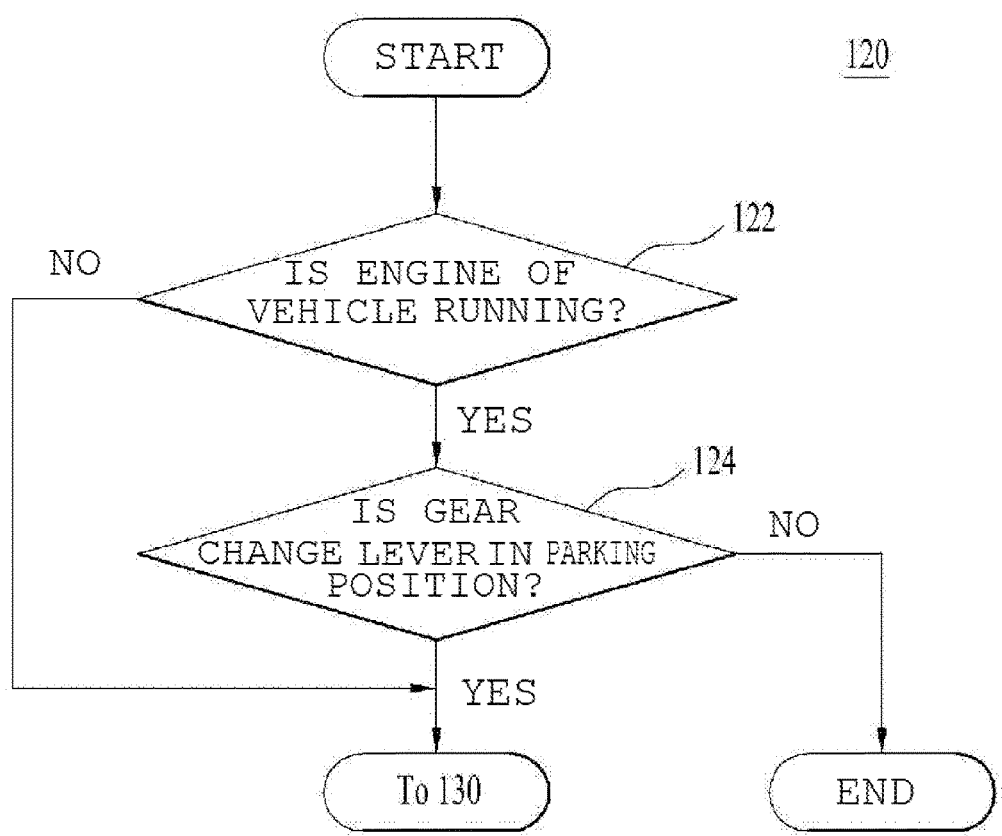
FIG. 4 is a flowchart illustrating an embodiment of Step 120 shown in FIG. 1.

FIG. 4 is a flowchart illustrating an embodiment 120A of Step 120 shown in FIG. 1.

In this embodiment, it is checked whether the engine of the vehicle is running (Step 122). When it is checked that the engine of the vehicle is not running, it may be determined that the vehicle is stationary. However, when it is determined that the engine of the vehicle is running, it is checked whether a gear change lever of the vehicle is located in a parking (P) position (Step 124). If the gear change lever of the vehicle is located in the parking (P) position, it is determined that the vehicle is stationary, and the procedure advances to Step 130. However, if the gear change lever of the vehicle is located in a neutral (N) position, a driving (D) position, a reverse (R) position, a first gear (D1) position, or a second gear (D2) position, rather than the parking (P) position, it is determined that the vehicle is not stationary, and the method 100 shown in FIG. 1 is finished. As described above, the position of the gear change lever may be used in order to check whether the vehicle is stationary.

In another embodiment, unlike what is shown in FIG. 4, Step 120 shown in FIG. 1 may include only Step 122 or Step 124. In addition, Step 122 and Step 124 may be performed regardless of the order.

In a still another embodiment, Step 120 may be performed before Step 110, Step 130, Step 140, Step 150, or Step 160, although Step 120 is shown as being performed after Step 110 and before Step 130 in FIG. 1.

In addition, it may be checked whether the vehicle is stationary using various methods other than the method shown in FIG. 4. If Step 120 is performed after Step 130 and before Step 140, it may be checked whether the vehicle is stationary using a 'motion image' acquired at Step 130. The motion image will be described hereinafter with reference to FIG. 5.

In a still another further embodiment, Step 120 shown in FIG. 1 may be omitted according to circumstances.

In the case in which Step 120, shown in FIG. 1, is omitted or performed after Step 130, information about motion of the user 40 or 42 (hereinafter, referred to as 'user's motion information' or 'motion information') is acquired when the user 40 or 42 has approached the trunk 20 (Step 130). However, in the case in which Step 120 shown in FIG. 1 is not omitted, information about the motion of the user 40 or 42 is acquired when the vehicle is stationary. Hereinafter, the vehicle trunk opening method 100 according to the embodiment will be described as including Step 120, as shown in FIG. 1. However, embodiments are not limited thereto. That is, the following description may also be applied to the case in which Step 120 is omitted or performed immediately before Step 110, Step 140, Step 150, or Step 160.

Figure 5:
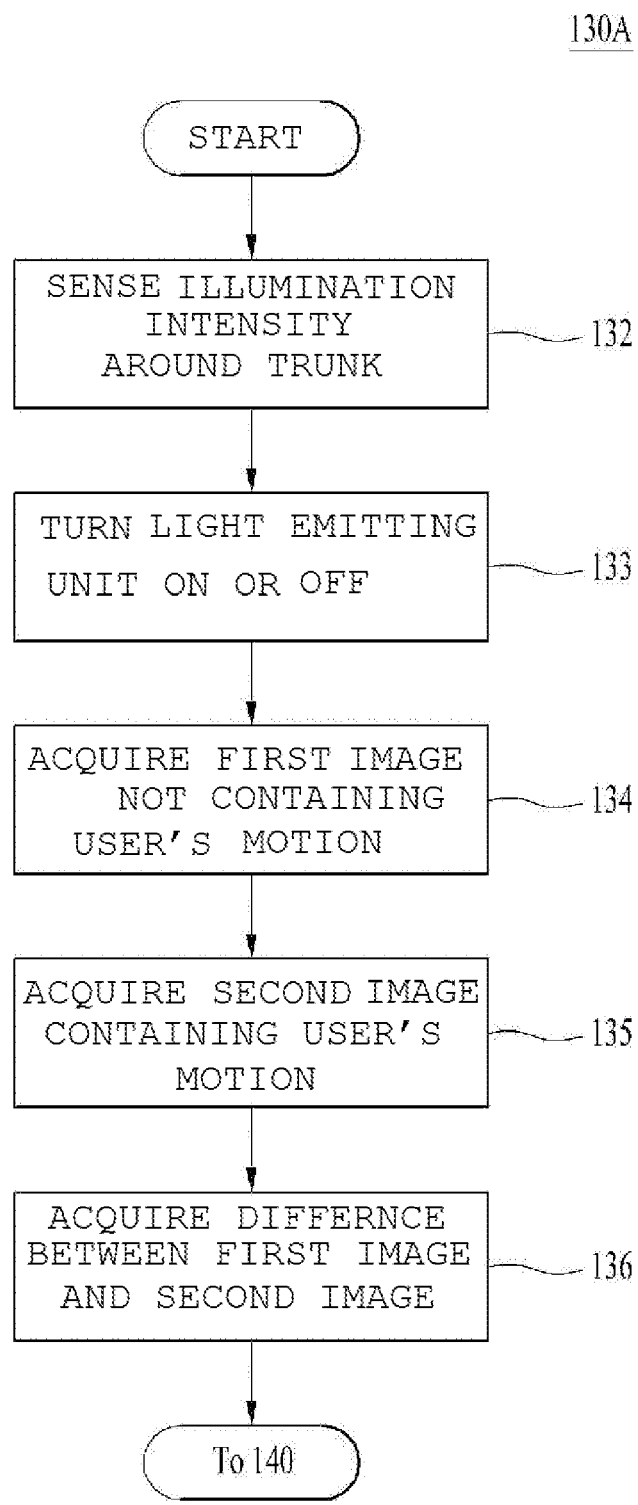
FIG. 5 is a flowchart illustrating an embodiment of Step 130 shown in FIG. 1.

FIG. 5 is a flowchart illustrating an embodiment 130A of Step 130 shown in FIG. 1.

Referring to FIG. 5, intensity of illumination around the trunk 20 is sensed in the state in which the vehicle is stationary (Step 132). After Step 132, a light emitting unit for emitting light to the front of the trunk 20 is turned on or off based on the sensed illumination (Step 133).

For example, as shown in FIGS. 2A and 2B, an illumination sensing unit 26 for sensing the intensity of illumination around the trunk 20 may be disposed around the trunk 20, e.g. at the lid of the trunk 20. However, embodiments are not limited thereto. In other embodiments, the illumination sensing unit 26 may be disposed at any portion of the front of the vehicle. The reason for this is that the intensity of illumination in front of the vehicle is the same as the intensity of illumination at the rear of the vehicle.

In addition, a light emitting unit 28 may be disposed around the trunk 20. For example, as shown in FIGS. 2A and 2B, the light emitting unit 28 may be disposed at a portion of the lid of the trunk 20 that is opposite the user 42.

Hereinafter, a description will be given with reference to FIGS. 6A to 6C for easy understanding of Step 134 to Step 136, shown in FIG. 5. However, embodiments are not limited thereto.

Figure 6A:
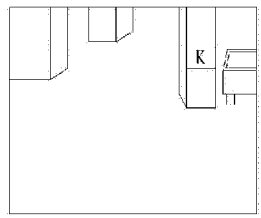
FIGS. 6A to 6C are views respectively showing frames of a first image, a second image, and a motion image.
Figure 6B:
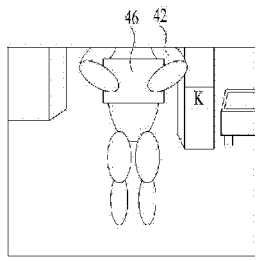
Figure 6C:
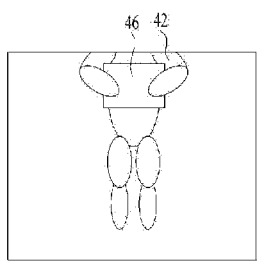

FIGS. 6a to 6c are views respectively showing frames of a first image, a second image, and a motion image.

The first image, the second image, and the motion image may each be a video (or moving image), which may include a plurality of still image frames. FIG. 6A exemplarily shows one frame of a first image, acquired by photographing an underground parking lot, and FIG. 6B exemplarily shows one frame of a second image, acquired by photographing the motion of the user 42 who has approached the front of the trunk 20 while holding a heavy object 46 in the underground parking lot.

After Step 133, when the user 40 has approached the trunk 20 but is not yet located in front of the trunk 20, the state in front of the trunk 20 that does not contain motion of the user 40 may be photographed and acquired as a first image (Step 134). For example, referring to FIGS. 2A and 2B, when the user 40 has approached the trunk 20 but is not located in front of the trunk 20, i.e. when the first separation distance between the user 40 and the keyhole 22 is the first critical distance, the state in front of the trunk that does not contain motion of the user 40 may be photographed to acquire a first image as shown in FIG. 6A. In order to acquire the first image when the user 40 is not located in front of the trunk 20, the maximum value of the first separation distance between the trunk 20 and the user 40 when the user 40 approaches the trunk 20 but before the user is located in front of the trunk 20 may be set as the first critical distance.

After Step 134, when the user 42, who has approached the trunk 20, is located in front of the trunk 20, the state in front of the trunk 20 that contains motion of the user 42 may be photographed and acquired as a second image (Step 135).

Here, the front of the trunk 20 means the positive x-axis direction, in which the user 42, who will use the trunk 20, is located.

For example, referring to FIGS. 2A and 2B, when the user 42 has approached the trunk 20 and is located in front of the trunk 20, i.e. when the second separation distance between the user 42 and the keyhole 22 is the second critical distance, the state in front of the trunk 20 that contains motion of the user 42 may be photographed and acquired as a second image as shown in FIG. 6B. Here, the second critical distance may be set as a predetermined distance d. The maximum value of the predetermined distance d may be the distance from the reference point when the separation distance is calculated, i.e. the entrance of the keyhole 22, to the outermost protruded part of the bumper 30 of the vehicle. However, embodiments are not limited thereto. For example, the predetermined distance d may be 5 cm. As described above, when the user 40 or 42 is located near the reference point, the second image is photographed and acquired. Consequently, it is possible to prevent the trunk 20 from being unintentionally opened when another person, who intends to open the trunk 20, approaches the trunk 20 or passes by the trunk 20. The reason for this is that there is a low probability that another person, who does not intend to open the trunk 20, will approach the reference point inside the protruded bumper 30 such that the person is within the predetermined distance d.

After Step 135, the difference between the first image and the second image is acquired as a 'motion image' (Step 136). For example, the difference between the second image, which has a plurality of frames, as shown in FIG. 6B, and the first image, which has a plurality of frames, as shown in FIG. 6A, may be acquired as a motion image having a plurality of frames, as shown in FIG. 6C. Subsequently, the procedure advances to Step 140.

The first image and the second image, acquired respectively at Step 134 and Step 135, may be images photographed using at least one selected from between infrared light and visible light. In the case in which the first image and the second image are images photographed using visible light, the embodiment 130A shown in FIG. 5 may include Step 132 and Step 133 in order to acquire the first image and the second image in the state in which the illumination around the vehicle is low at night. However, embodiments are not limited thereto. That is, in other embodiments, in the case in which the first image and the second image are images photographed using infrared light, the embodiment 130A shown in FIG. 5 may not include Step 132 and Step 134.

Figure 7:
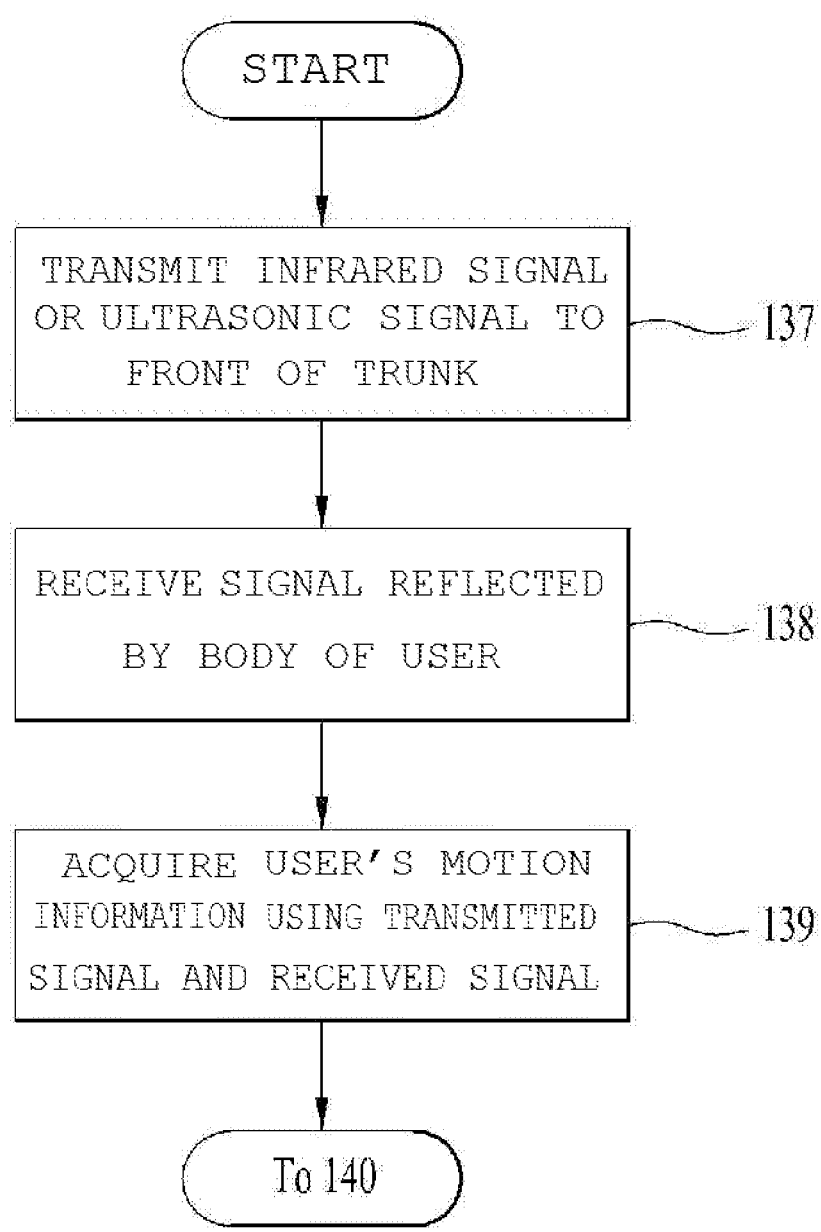
FIG. 7 is a flowchart illustrating another embodiment of Step 130 shown in FIG. 1.

FIG. 7 is a flowchart illustrating another embodiment 130B of Step 130 shown in FIG. 1.

In this embodiment, a signal is transmitted to the front of the trunk 20 (Step 137). Here, the transmitted signal may include an infrared signal or an ultrasonic signal. Subsequently, a signal reflected by the body of the user 42 is received (Step 138). Subsequently, the user's motion information is acquired using the transmitted signal and the received signal (Step 139). The second separation distance between the user 42, who is located near the trunk 20, and the trunk 20 may be set using the difference Δt between the time t1 at which the infrared signal or the ultrasonic signal is transmitted and the time t2 at which the signal reflected by the body of the user 42 is received and the speed of the transmitted signal. If the user 42 is not located in the front of the trunk 20 or is far away from the trunk 20, the first separation distance may be greater than the first critical distance. In this case, the first separation distance may be ignored. In addition, in order to prevent a signal that is reflected by the body of another person passing by the trunk 20 and is then received from being misperceived as a signal that is reflected by the user and then received, a plurality of signals may be transmitted and received.

Consequently, the separation distance between the trunk 20 and the user 42 may be calculated using the transmitted signal and the received signal, and information about the motion of the user 42 may be acquired using the calculated separation distance. As previously described, it is possible to determine that the user 40 or 42 is located near the vehicle through wireless communication with the wireless communication unit 44 held by the user 40 or 42. There is a possibility that a person who is located in front of the trunk 20 for a long time after it is determined that the user 40 is approaching the trunk 20 is the user 42. As shown in FIG. 7, therefore, information about the motion of the user 42 may be acquired using a signal, rather than an image.

In the case in which Step 130 is performed by the embodiment 130B shown in FIG. 7 instead of FIG. 5, the critical distance compared with the separation distance at Step 118, shown in FIG. 3, may be set as the predetermined distance d shown in FIG. 2A. The reason for this is that, when the critical distance is small, it is possible to prevent the trunk 20 from being unnecessarily opened unless another person is located near the reference point, i.e. the keyhole 22, even though the person is located in front of the trunk 20.

Meanwhile, referring back to FIG. 1, it is determined whether the user's motion is intentional motion performed with the intent of opening the trunk 20 based on the user's motion information acquired at Step 130 (Step 140). Here, the 'intentional motion' is the motion of an authenticated user 42 who intends to open the trunk 20. For example, the intentional motion may be a user's gesture. The intentional motion may be set by the user 42 or the vehicle manufacturer in advance and provided. The reason for this is that, in the vehicle trunk opening method according to the embodiment, it is necessary to determine whether the user's motion is intentional motion.

For example, the intentional motion may be set in advance as various gestures using parts (e.g. the hips, the abdomen, and the hands) of the body of the user.

Hereinafter, various examples of intentional motion will be described. However, the intentional motion is not limited to the following examples.

First Example of Intentional Motion

Figure 8A:
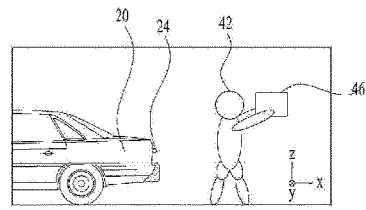
FIGS. 8A to 8C are views showing a first example of intentional motion.
Figure 8B:
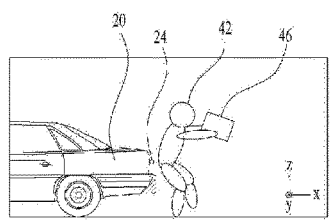
Figure 8C:
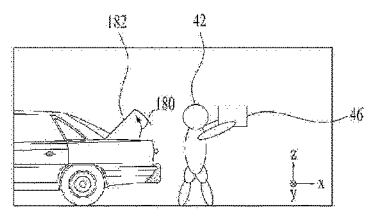

FIGS. 8a to 8c are views showing a first example of intentional motion.

First, as shown as an example in FIG. 8A, the user 42 approaches the front of the trunk 20 in order to put a heavy object 46 in the trunk 20.

Subsequently, as shown in FIG. 8B, the user 42 moves part of his/her body, e.g. his/her hips, near the reference point of the separation distance in the negative x-axis direction, since the user 42 cannot clearly look in front of him/her if the volume of the object 46 is large. Here, it is assumed that the reference point for calculating the separation distance is the camera 24, rather than the keyhole 22. It is not necessary for the user 42 to move his/her hips in order to contact the lens of the camera 24, but it is sufficient for the user 42 to move his/her hips toward the lens of the camera 24 such that his/her hips are within the predetermined distance d, as shown in FIG. 2A.

Subsequently, as shown as an example in FIG. 8C, the user 42 pulls his/her hips located near the camera 24 back, in the positive x-axis direction, which is opposite the direction shown in FIG. 8A.

As described above, in the first example of intentional motion, the user's motion performed in the sequence shown in FIGS. 8A to 8C, in which part of the body of the user 42, e.g. the hips of the user 42, approaches the camera 24 such that the hips of the user 42 are within the predetermined distance d and then retreats from the camera 24, corresponds to the intentional motion.

Second Example of Intentional Motion

Figure 9A:
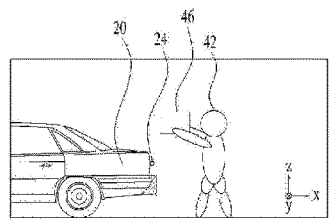
FIGS. 9A to 9C are views showing a second example of intentional motion.
Figure 9B:
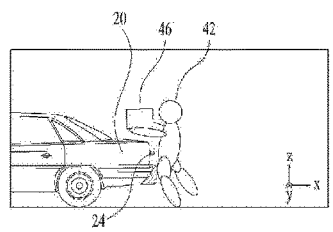
Figure 9C:
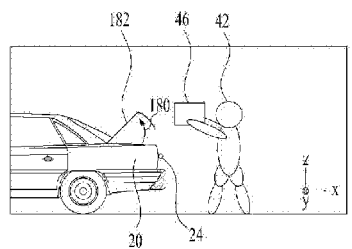

FIGS. 9a to 9c are views showing a second example of intentional motion.

First, as shown as an example in FIG. 9A, the user 42 approaches the front of the trunk 20 in order to put a heavy object 46 in the trunk 20, in the same manner as in FIG. 8A.

Subsequently, as shown in FIG. 9B, the user 42 moves part of his/her body, e.g. his/her abdomen, near the reference point of the separation distance, i.e. the camera 24, in the negative x-axis direction, since the user 42 can clearly look in front of him/her if the volume of the object 46 is less than the volume of the object 46 shown in FIGS. 8A to 8C. In the same manner as in the first example of intentional motion, it is not necessary for the user 42 to move his/her abdomen so as to contact the camera 24, but it is sufficient for the user 42 to move his/her abdomen toward the lens of the camera 24 such that his/her abdomen is within the predetermined distance d, as shown in FIG. 2A.

Subsequently, as shown as an example in FIG. 9C, the user 42 pulls his/her abdomen located near the camera 24 back, in the positive x-axis direction, which is opposite the direction shown in FIG. 9A.

As described above, in the second example of intentional motion, the user's motion performed in the sequence shown in FIGS. 9A to 9C, in which part of the body of the user 42, e.g. the abdomen of the user 42, approaches the camera 24 such that the abdomen of the user 42 is within the predetermined distance d and then retreats from the camera 24, corresponds to the intentional motion.

The first and second aforementioned examples of intentional motion may have a further condition to be a new intentional motion. For example, the user's motion in which the user approaches the camera 24 within the predetermined distance d, stays for at least a predetermined time, e.g. at least 2 seconds, and then retreats from the camera 24, may be set as the new intentional motion. Here, the staying of the user corresponds to the further condition.

Third Example of Intentional Motion

Figure 10A:
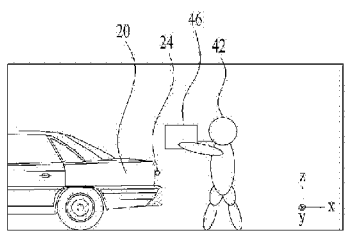
FIGS. 10A and 10B are views showing a third example of intentional motion.
Figure 10B:
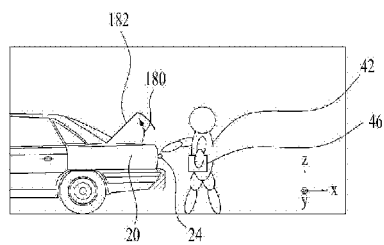

FIGS. 10a and 10b are views showing a third example of intentional motion.

First, as shown as an example in FIG. 10A, the user 42 approaches the front of the trunk 20 in order to put an object 46 of relatively small bulk in the trunk 20.

Subsequently, as shown in FIG. 10B, in the case in which the volume of the object 46 is less than the volume of the object 46 shown in FIGS. 8A to 9C, the user 42 moves the palm of one hand toward the reference point for calculating the separation distance, i.e. toward the camera 24, such that the palm of the hand is within the predetermined distance d while holding the object 46 using the other hand, and then shakes the palm of the hand in the positive y-axis direction or in the negative y-axis direction or covers and then uncovers the camera 24 with the palm of the hand. In the same manner as in the first and second examples of intentional motion, it is not necessary for the user 42 to move his/her hand so as to contact the camera 24, but it is sufficient for the user 42 to move his/her hand toward the lens of the camera 24 such that his/her hand is within the predetermined distance d, as shown in FIG. 2A.

The motion of the user 42 performed in the sequence shown in FIGS. 10A and 10B corresponds to the intentional motion.

As described above, in the third example of intentional motion, the user's motion performed in the sequence shown in FIGS. 10A and 10B, in which part of the body of the user 42, e.g. the palm of the hand of the user 42, approaches the camera 24 such that the palm of the hand of the user 42 is within predetermined distance d and then covers and uncovers the camera 24, corresponds to the intentional motion.

In the first to third examples of intentional motion, the intentional motion may be set using the hips, the abdomen, or the hand of the user. However, embodiments are not limited thereto. In other examples, the intentional motion may be set using the trunk (or, a side of the body) of the user.

In addition, all the first to third examples of intentional motion may be set as a new intentional motion. In this case, the user, who intends to open the trunk, must provide the first to third examples of intentional motion.

As described above, the intentional motion may be variously set in advance.

In the second example of intentional motion, it may be determined whether the user's motion corresponds to the intentional motion, as follows (Step 140).

Figure 11A:
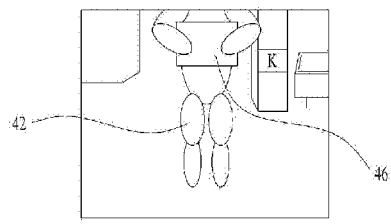
FIGS. 11A to 11C are views exemplarily showing a plurality of frames constituting a second image.
Figure 11B:
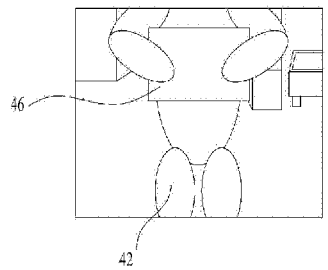
Figure 11C:
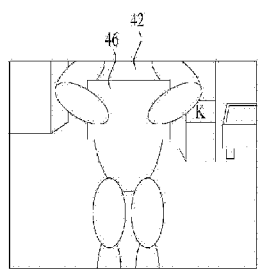
Figure 12A:
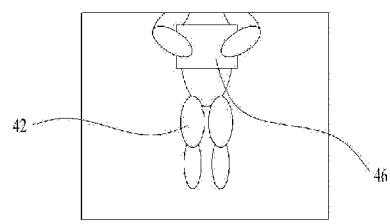
FIGS. 12A to 12C are views exemplarily showing a plurality of frames constituting a motion image.
Figure 12B:
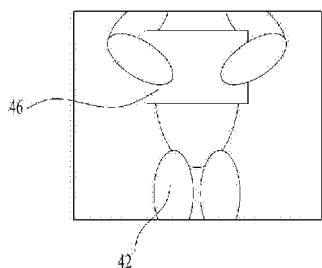
Figure 12C:
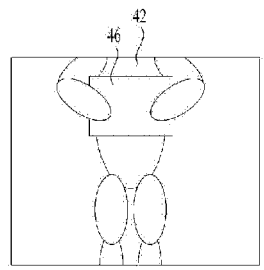

FIGS. 11a to 11c are views exemplarily showing a plurality of frames constituting a second image, and FIGS. 12A to 12C are views exemplarily showing a plurality of frames constituting a motion image.

FIG. 11a shows one frame of a second image acquired by photographing the user using the camera 24 when the user is located in front of the trunk 20, as shown in FIG. 9A. FIG. 11B shows another frame of the second image acquired by photographing the user using the camera 24 when the user approaches the camera 24 in the negative x-axis direction in front of the trunk 20, as shown in FIG. 9B. FIG. 11C shows a further frame of the second image acquired by photographing the user using the camera 24 when the user moves away from the camera 24 in the positive x-axis direction in front of the trunk 20, as shown in FIG. 9C.

FIGS. 12A, 12B, and 12C correspond to the frames of a motion image, which are the differences between the second image shown in FIGS. 11A, 11B, and 11C and the first image shown in FIG. 6A, respectively.

In the case in which the second image is acquired as shown in FIGS. 11A and 11B when the user moves to match the intentional motion set as shown in FIGS. 9A to 9C after the first image is acquired as shown in FIG. 6A, the motion image, which corresponds to the difference between the first image and the second image, is acquired as shown in FIGS. 12A to 12C (Step 136).

In an embodiment, it may be determined whether the user's motion corresponds to intentional motion using the rate of change of the user's motion calculated from the motion image acquired as described above.

Figure 13:
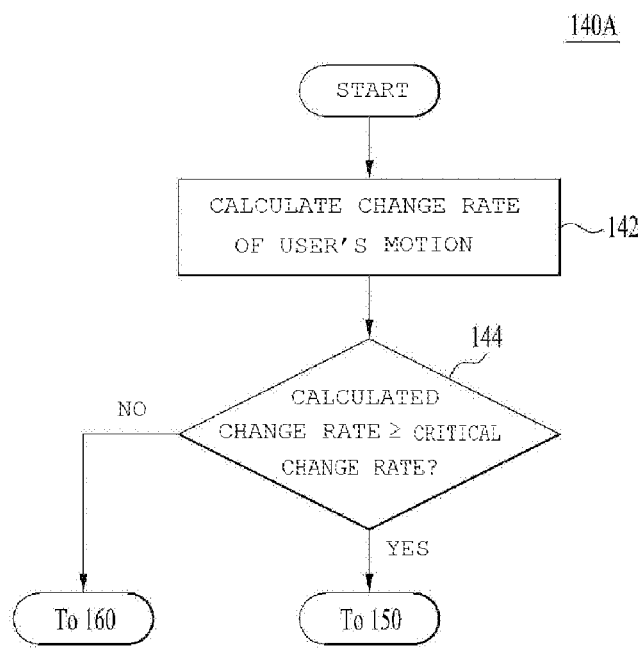
FIG. 13 is a flowchart illustrating an embodiment of Step 140 shown in FIG. 1.

FIG. 13 is a flowchart illustrating an embodiment 140A of Step 140 shown in FIG. 1.

The rate of change of the user's motion is calculated from the motion image acquired at Step 130 (Step 142). After Step 142, it is determined whether the calculated rate of change is equal to or greater than a critical rate of change (Step 144).

If the calculated rate of change is equal to or greater than the critical rate of change, the procedure advances to Step 150, at which the trunk is opened.

It is assumed that the frames of the motion image have been acquired as shown in FIGS. 12A to 12C for easy understanding of Step 140A, shown in FIG. 13.

Figure 14:
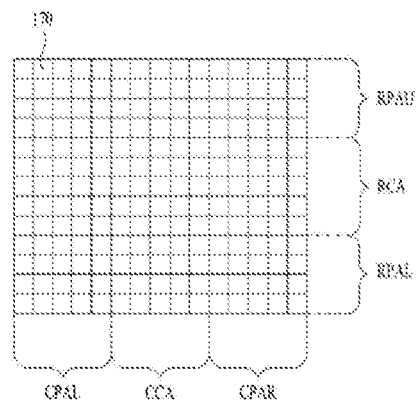
FIG. 14 is a view exemplarily showing a unit frame included in the motion image.

FIG. 14 is a view exemplarily showing a unit frame included in the motion image acquired at Step 136. The unit frame may include a plurality of pixels 170.

Referring to FIG. 14, the pixels 170 included in the unit frame may be divided into a column peripheral area left (CPAL), a column peripheral area right (CPAR), and a column center area (CCA) on the basis of columns. In addition, the pixels 170 may be divided into a row peripheral area upper (RPAU), a row peripheral area lower (RPAL), and a row center area (RCA) on the basis of rows.

The rate of change of the user's motion, calculated at Step 142, may include a rate of change of a pixel luminance level between adjacent frames, among the frames included in the motion image. For example, in the case in which adjacent frames $F_{N-1}$, $F_N$, and $F_{N+1}$, among the frames included in the motion image, are as shown in FIGS. 12A to 12C, the variation between the luminance level of each pixel 170 in the (N−1)-th frame shown in FIG. 12A and the luminance level of each pixel 170 in the N-th frame shown in FIG. 12B (hereinafter, referred to as a 'first luminance level variation') is calculated. Subsequently, the variation between the luminance level of each pixel 170 in the N-th frame shown in FIG. 12B and the luminance level of each pixel 170 in the (N+1)-th frame shown in FIG. 12C (hereinafter, referred to as a 'second luminance level variation') is calculated. Here, N indicates the frame number. When N is large, it means the latest frame. When N is small, it means the previous frame.

Subsequently, the first luminance level variation is divided by the time interval between the adjacent frames $F_{N-1}$ and $F_N$ in order to calculate a luminance level change rate (hereinafter, referred to as a 'first luminance level change rate'). Similarly, the second luminance level variation is divided by the time interval between the adjacent frames $F_N$ and $F_{N+1}$ in order to calculate a luminance level change rate (hereinafter, referred to as a 'second luminance level change rate').

Subsequently, the first and second luminance level change rates are compared with a critical change rate, and when the first and second luminance level change rates are equal to or greater than the critical change rate, the procedure advances to Step 150 (Step 144).

In addition, when observing each frame of the motion image shown in FIGS. 12A to 12C, the luminance level change rate is higher in the middle of each frame than in the periphery of each frame. That is, the luminance level change rate in the CCA is higher than the luminance level change rate in the OPAL or the CPAR. Consequently, it is possible to determine whether the user's motion is intentional motion based on the determination as to where the luminance level change rate is high in each frame (Step 140A).

First, the luminance level change rate of the pixels in the column center area (CCA) of each of the adjacent frames, e.g. the frames $F_{N-1}$, $F_N$, and $F_{N+1}$, shown in FIGS. 12A to 12C (hereinafter, referred to as a 'first position luminance change rate') is calculated (Step 142). Subsequently, the luminance level change rate of the pixels in the column peripheral area left (CPAL) and the column peripheral area right (CPAR) of each of the frames $F_{N-1}$, $F_N$, and $F_{N+1}$ (hereinafter, referred to as a 'second position luminance change rate') is calculated (Step 142).

Subsequently, the first and second position luminance change rates are compared with a critical change rate to determine which of the first and second position luminance change rates is higher (Step 144). In other embodiments, the first and second position luminance change rates may be compared with each other to determine which of the first and second position luminance change rates is higher.

In the second example of intentional motion, the luminance level change rate of the pixels belonging to the column center area (CCA) of each frame of the motion image is higher. Consequently, the procedure advances to Step 150 when the first position luminance change rate is higher than the second position luminance change rate, and the procedure advances to Step 160 when the first position luminance change rate is not higher than the second position luminance change rate (Step 144).

As described above, the luminance level change rate of the pixels in the column center area (CCA) of each of the frames $F_{N-1}$, $F_N$, and $F_{N+1}$ and the position luminance change rate of the luminance level of the pixels in the column peripheral area left (CPAL) and the column peripheral area right (CPAR) of each of the frames $F_{N-1}$, $F_N$, and $F_{N+1}$ are calculated, and the calculated position luminance variations are compared with each other to determine which of the calculated position luminance variations is higher, in order to more accurately determine whether the user's motion is intentional motion.

Figure 15A:
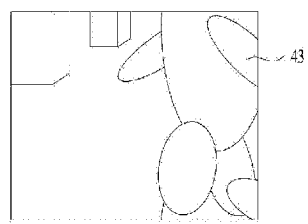
FIGS. 15a to 15c are views showing frames of a second image of a person other than a user.
Figure 15B:
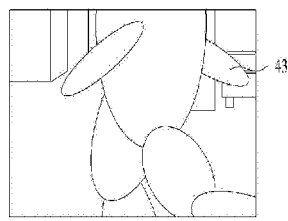
Figure 15C:
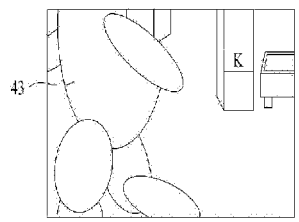

FIGS. 15a to 15c are views showing the frames of a second image of another person 43, not the user 42.

A motion image corresponding to the differences between the second image of the person 43 passing by the trunk 20 of the vehicle, which has the frames shown in FIGS. 15A to 15C, and the first image having the frame shown in FIG. 6A is acquired (Step 130). In this case, the first position luminance change rate of the luminance level of the pixels in the column center area (CCA) of each of the adjacent frames $F_{N-1}$, $F_N$, and $F_{N+1}$ included in the motion image and the second position luminance change rate of the luminance level of the pixels in the column peripheral area left (CPAL) and the column peripheral area right (CPAR) of each of the frames $F_{N-1}$, $F_N$, and $F_{N+1}$ are calculated (Step 142). Subsequently, the first and second position luminance change rates are compared with the critical change rate (Step 144), or the first and second position luminance levels are compared with each other. At this time, the first and second position luminance levels are almost the same. Since there is little difference between the first and second position luminance change rates, therefore, the motion of the person 43 is determined not to be intentional motion.

Even though the second image is acquired in the case in which the person 43 passes by the reference point in the state in which the person is within the predetermined distance d, as described above, it is possible to prevent the trunk 20 of the vehicle from being mistakenly opened due to the person 43 passing by the trunk 20.

Meanwhile, intentional motion may be variously set such that the luminance level change rates in the RPAU, the RPAL, and the RCA of each frame of the motion image may be obtained and it is determined whether the user's motion is intentional motion based on the obtained luminance level change rates, similar to the comparison between the position luminance change rates in the CCA, the CPAL, and the CPAR in order to determine whether the trunk is to be opened. That is, the intentional motion may be set as motion having a high luminance level change rate in one of the RPAU, the PEAL, and the RCA.

Figure 16:
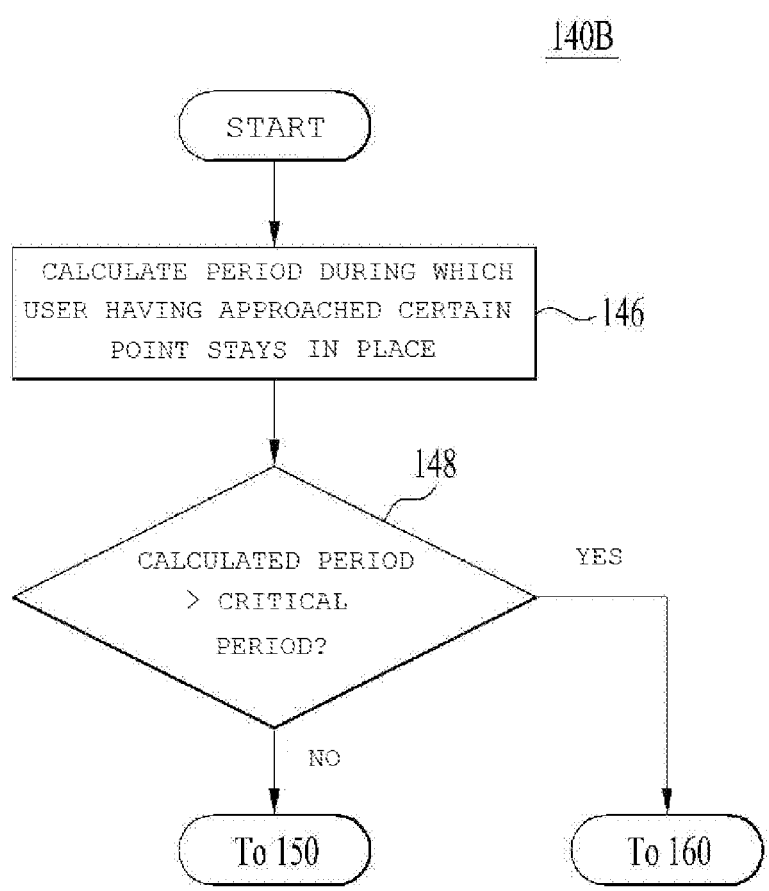
FIG. 16 is a flowchart illustrating another embodiment of Step 140 shown in FIG. 1.

FIG. 16 is a flowchart illustrating another embodiment 140B of Step 140 shown in FIG. 1.

Referring to FIG. 16, the period during which the user 42, who has approached at least one certain point of the trunk 20, stays in place is measured (Step 146). Here, referring to FIGS. 2A and 2B, the at least one certain point may be at least one selected from among the position of the keyhole 22, the position of the camera 24, the position of the illumination sensor 26, and the position of the light emitting unit 28. However, embodiments are not limited thereto. For example, in the case in which the certain point is the position of the camera 24, the period during which the user, having approached the camera 24, stays in place may be measured using the motion image of the user acquired at Step 130.

For example, in the case in which the user leans against the trunk 20, the period during which the luminance level change rate of the pixels in the column center area (CCA) of each of the adjacent frames, among the frames included in the motion image is not changed may be determined to be the period during which the user 42 stays in place at the certain point of the trunk 20.

Subsequently, it is determined whether the period measured at Step 146 has exceeded a critical period (Step 148). If the period measured at Step 146 has not exceeded the critical period, the procedure advances to Step 150. Here, the critical period may be set as the period during which the user 42, who holds a heavy or bulky object 46, stays in place at the reference point in order to put the object 46 in the trunk 20. For example, the critical period may be set as 5 seconds. That is, in the first and second examples of intentional motion described above, when the user approaches a certain point in the negative x-axis direction such that the user is within the predetermined distance d and then moves away from the certain point in the positive x-axis direction within 5 seconds, the procedure advances to Step 150, at which the trunk 20 is opened.

However, when the user approaches the certain point such that the user is within the predetermined distance d and then stays for more than 5 seconds, it is determined that the user 42 does not intend to open the trunk 20, and the procedure advances to Step 160.

If the user 43 leans against a certain point of the trunk 20 for a long time, it may be erroneously determined that the user's motion is intentional motion performed with the intent of opening the trunk 20 even though the user does not intend to open the trunk 20, with the result that the trunk 20 may be opened. If the period during which the user stays exceeds the critical period, however, the trunk 20 is not opened, whereby it is possible to prevent the trunk 20 from being unintentionally opened.

Although not shown, in another embodiment of Step 140 shown in FIG. 1, information about the user's movement is acquired from the user's motion information acquired at Step 130. Here, the information about the user's movement may include at least one selected from among whether the user is stationary, the speed of the user's movement, the speed at which the user approaches a certain point, the direction of the user's movement, and the speed at which the user approaches a certain point of the trunk. The movement information may be acquired using the motion image or through wireless communication with the wireless communication unit 44 held by the user.

The above-described movement information may be used as main information or auxiliary information for determining whether the trunk 20 is to be opened. In the case in which the movement information is used as auxiliary information, for example, when the speed at which the user approaches a certain point of the trunk 20 is low even though the user makes a gesture corresponding to intentional motion, the trunk 20 may not be opened. Particularly, in the case in which the user's motion information is acquired using a signal, rather than an image, as shown in FIG. 7, it may be more accurately determined whether the trunk 20 is to be opened by additionally using the movement information.

Meanwhile, referring back to FIG. 1, upon determining that the user's motion is the intentional motion based on the user's motion information, the trunk 20 is opened (Step 150). For example, when the user 42 makes a gesture of moving his/her hips, as shown in FIGS. 8A to 8C, the lid of the trunk 20 is opened in the direction indicated by an arrow 180 shown in FIG. 8C such that the trunk 20 is opened. In addition, when the user 42 makes a gesture of moving his/her abdomen, as shown in FIGS. 9A to 9C, the lid of the trunk 20 is opened in the direction indicated by an arrow 180 shown in FIG. 9C such that the trunk 20 is opened. In addition, when the user 42 makes a gesture of moving his/her hand, as shown in FIGS. 10A and 10B, the lid of the trunk 20 is opened in the direction indicated by an arrow 180 shown in FIG. 10B such that the trunk 20 is opened.

However, upon determining that the user's motion is not intentional motion based on the user's motion information, an alarm indicating that the trunk 20 cannot be opened may be given (Step 160). Consequently, in the case in which the user 42, who intends to open the trunk 20, makes a gesture that does not correspond to intentional motion, an alarm indicating that the trunk 20 cannot be opened may be given to the user so that the user reattempts a gesture corresponding to intentional motion. According to circumstances, Step 160 may be omitted from the vehicle trunk opening method shown in FIG. 1.

Hereinafter, a vehicle trunk opening device according to an embodiment, which performs the methods shown in FIGS. 1, 3 to 5, 7, 13, and 16, will be described with reference to FIGS. 17 to 24. However, embodiments are not limited thereto. That is, the methods shown in FIGS. 1, 3 to 5, 7, 13, and 16 may be performed by a device having a different structure than the device shown in FIGS. 17 to 24. In addition, the operations of units of the device shown in FIGS. 17 to 24 are related to the steps of the methods shown in FIGS. 1, 3 to 5, 7, 13, and 16, and therefore, a duplicated description thereof will be omitted. In addition, the units of the device will be described with reference to FIGS. 2A and 2B for easy understanding. However, embodiments are not limited thereto.

Figure 17:
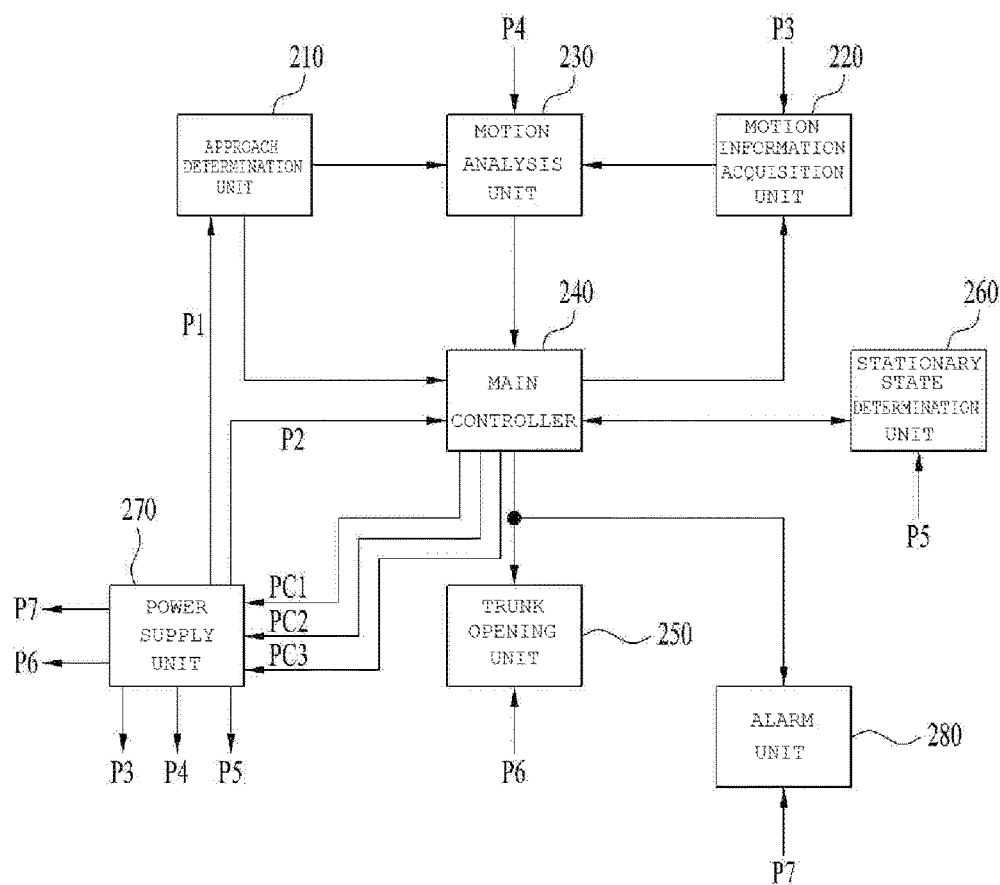
FIG. 17 is a schematic block diagram showing a vehicle trunk opening device according to an embodiment.

FIG. 17 is a schematic block diagram showing a vehicle trunk opening device 200 according to an embodiment.

Referring to FIG. 17, the vehicle trunk opening device 200 includes an approach determination unit 210, a motion information acquisition unit 220, a motion analysis unit 230, a main controller 240, a trunk opening unit 250, a stationary state determination unit 260, a power supply unit 270, and an alarm unit 280.

The approach determination unit 210 determines whether the user 40 or 42 has approached the trunk 20, and outputs the result of determination to the main controller 240 as an approach signal. That is, the approach determination unit 210 performs Step 110 shown in FIG. 1.

Figure 18:
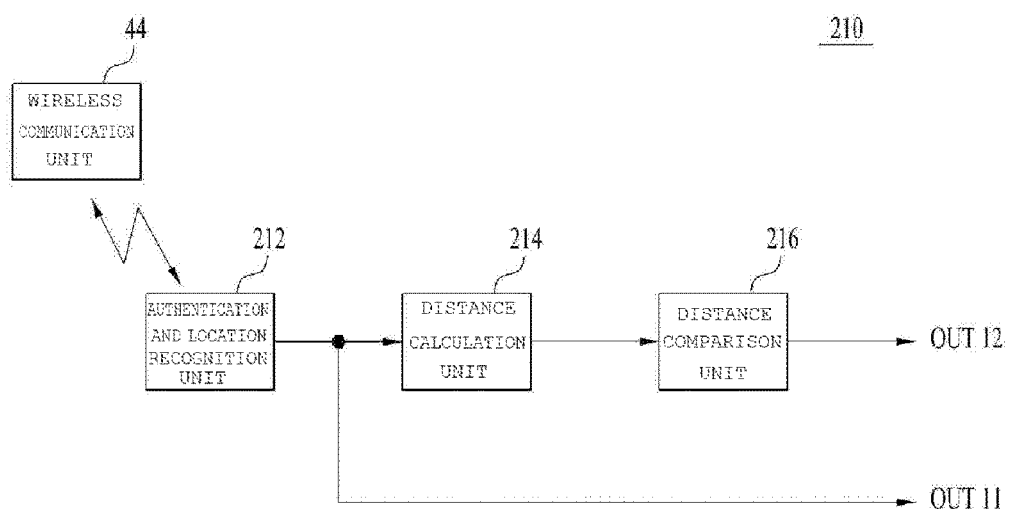
FIG. 18 is a block diagram showing an embodiment of an approach determination unit shown in FIG. 17.

FIG. 18 is a block diagram showing an embodiment 210 of the approach determination unit 210 shown in FIG. 17.

Referring to FIG. 18, the approach determination unit 110 includes an authentication and location recognition unit 212, a distance calculation unit 214, and a distance comparison unit 216. The approach determination unit 110 shown in FIG. 18 performs Step 110 shown in FIG. 3.

First, the authentication and location recognition unit 212 authenticates the user 40 or 42 through wireless communication with the wireless communication unit 44 held by the user 40 or 42, recognizes the location of the authenticated user, and outputs the recognized location to the distance comparison unit 216. In addition, the authentication and location recognition unit 212 outputs the recognized location to the motion analysis unit 230 and the main controller 240 through an output terminal OUT11. The authentication and location recognition unit 212 performs Step 112 and Step 114 shown in FIG. 3. Here, the wireless communication unit 44 may be included in a smart key.

The distance calculation unit 214 calculates the separation distance between the trunk 20 and the user 40 or 42 based on the location recognized by the authentication and location recognition unit 212, and outputs the calculated separation distance to the distance comparison unit 216. The distance calculation unit 214 performs Step 116 shown in FIG. 3.

The distance comparison unit 216 compares the separation distance calculated by the distance calculation unit 214 with a critical distance, and outputs the result of comparison to the main controller 240 through an output terminal OUT12 as an approach signal. The distance comparison unit 216 performs Step 118 shown in FIG. 3.

Meanwhile, the motion information acquisition unit 220 acquires the user's motion information in response to an acquisition control signal from the main controller 240, and outputs the acquired user's motion information to the motion analysis unit 230. The motion information acquisition unit 220 performs Step 130, shown in FIG. 1. To this end, the main controller 240 generates the acquisition control signal in response to the approach signal output from the approach determination unit 210.

Figure 19:
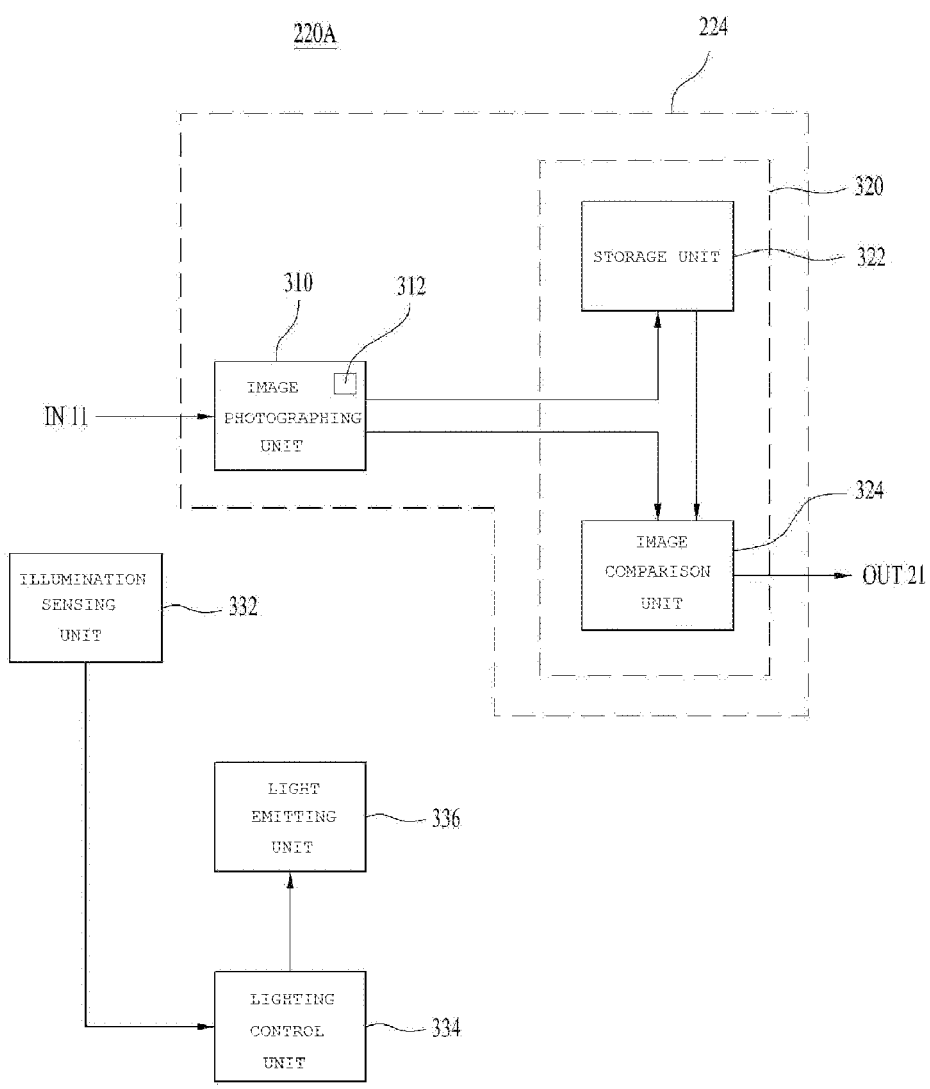
FIG. 19 is a block diagram showing an embodiment of a motion information acquisition unit shown in FIG. 17.

FIG. 19 is a block diagram showing an embodiment 220A of the motion information acquisition unit 220 shown in FIG. 17.

The motion information acquisition unit 220A shown in FIG. 19 includes an image photographing unit 310, an image difference generation unit 320, an illumination sensing unit 332, a lighting control unit 334, and a light emitting unit 336. The motion information acquisition unit 220A shown in FIG. 19 performs Step 130A shown in FIG. 5.

The image photographing unit 310 photographs the state in front of the trunk 20 that does not contain the user's motion in response to a first level acquisition control signal received from the main controller 240 through an input terminal IN11, and outputs the photographed image to the image difference generation unit 320 as a first image. To this end, the main controller 240 generates the first level acquisition control signal upon determining that the user, having approached the trunk 20, is not yet located in front of the trunk 20 based on the recognized location of the authenticated user received from the authentication and location recognition unit 212. The image photographing unit 310 performs Step 134 shown in FIG. 5.

In addition, the image photographing unit 310 photographs the state in front of the trunk 20 that contains the user's motion in response to a second level acquisition control signal received from the main controller 240 through the input terminal IN11, and outputs the photographed image to the image difference generation unit 320 as a second image. To this end, the main controller 240 generates the second level acquisition control signal upon determining that the user, having approached the trunk 20, is located in front of the trunk 20 based on the recognized location of the authenticated user received from the authentication and location recognition unit 212. The image photographing unit 310 performs Step 135 shown in FIG. 5.

The image difference generation unit 320 outputs a motion image, which is the difference between the second image and the first image, to the motion analysis unit 230 and the main controller 240 through an output terminal OUT21 as user's motion information. The image difference generation unit 320 performs Step 136 shown in FIG. 5.

In order to perform Step 136, the image difference generation unit 320 may include a storage unit 322 and an image comparison unit 324. The storage unit 322 stores the first and second images received from the image photographing unit 310. The image comparison unit 324 compares the first image and the second image, stored in the storage unit 322, with each other to generate an image difference, and outputs the generated image difference through the output terminal OUT21 as a motion image.

The image photographing unit 310 may be the camera 24 shown in FIGS. 2A and 2B. Here, the camera 24 may include a rear monitoring camera mounted on the vehicle for rear monitoring or a camera dedicated for an around view system.

In addition, the image photographing unit 310 and the image difference generation unit 320 may be included in a single module. Here, the inclusion of the image photographing unit 310 and the image difference generation unit 320 in the single module may mean that the image photographing unit 310 and the image difference generation unit 320 are mounted on the same printed circuit board (PCB).

In addition, the image photographing unit 310 may use at least one selected from between infrared light and visible light to acquire the first and second images. In the case in which the image photographing unit 310 acquires the first and second images using infrared light, the first and second images may be acquired even at night, at which time illumination around the trunk 20 is low.

In the case in which the image photographing unit 310 acquires the first and second images using visible light, however, the image photographing unit 310 may include an infrared filter 312. The infrared filter 312 filters infrared light out among infrared light and visible light. As a result, the image photographing unit 310 may acquire the first and second images using visible light. In addition, in the case in which the image photographing unit 310 acquires the first and second images using visible light, the image photographing unit 310 may further include an illumination sensing unit 332, a lighting control unit 334, and a light emitting unit 336, in order to acquire the first and second images even at night, at which time illumination is low. In the case in which the image photographing unit 310 acquires the first and second images using infrared light in the state in which the infrared filter 312 is not included, however, the illumination sensing unit 332, the lighting control unit 334, and the light emitting unit 336 may be omitted.

The illumination sensing unit 332 senses the illumination intensity around the trunk 20, and outputs the sensing result to the lighting control unit 334. The illumination sensing unit 332 performs Step 132 shown in FIG. 5.

The lighting control unit 334 generates a light emission control signal in response to the illumination intensity sensed by the illumination sensing unit 332, and output the generated light emission control signal to the light emitting unit 336. The light emitting unit 336 emits light in response to the light emission control signal output from the lighting control unit 334. The lighting control unit 334 and the light emitting unit 336 perform Step 133 shown in FIG. 5. Here, the illumination sensing unit 332 and the light emitting unit 336 correspond respectively to the illumination sensing unit 26 and the light emitting unit 28 shown in FIGS. 2A and 2B. The light emitting unit 28 or 336 may be a taillight lamp of the vehicle. However, embodiments are not limited thereto. In other embodiments, the light emitting unit 28 or 336 may be a separate light lamp other than the taillight lamp. In this case, the light emitting unit 28 or 336 may be disposed at the lid of the trunk, as shown in FIGS. 2A and 2B.

Figure 20:
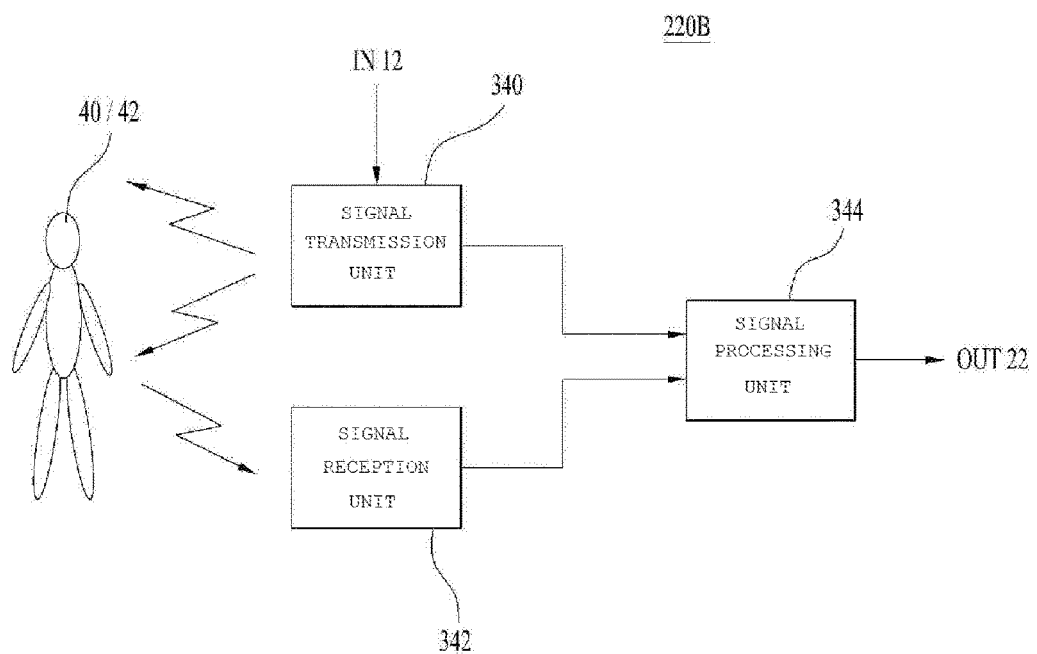
FIG. 20 is a block diagram showing another embodiment of the motion information acquisition unit shown in FIG. 17.

FIG. 20 is a block diagram showing another embodiment 220B of the motion information acquisition unit 220 shown in FIG. 17.

The motion information acquisition unit 220B shown in FIG. 20 includes a signal transmission unit 340, a signal reception unit 342, and a signal processing unit 344. The motion information acquisition unit 220B performs Step 130B shown in FIG. 7.

The signal transmission unit 340 transmits a signal toward the front of the trunk 20 in response to the acquisition control signal output from the main controller 240 and received through an input terminal IN12. The signal transmission unit 340 performs Step 137 shown in FIG. 7. The signal transmitted by the signal transmission unit 340 may include an infrared signal or an ultrasonic signal.

The signal reception unit 342 receives a signal transmitted by the signal transmission unit 340 and reflected by the body of the user. The signal reception unit 342 performs Step 138 shown in FIG. 7.

The signal processing unit 344 processes the transmitted signal and the received signal to acquire user's motion information, and outputs the acquired user's motion information to the motion analysis unit 230 and the main controller 240 through an output terminal OUT22. The signal processing unit 344 performs Step 139 shown in FIG. 7.

Meanwhile, the motion analysis unit 230 analyzes the user's motion information output from the motion information acquisition unit 220 to determine whether the user's motion is intentional motion performed with the intent of opening the trunk 20, and output the result of analysis to the main controller 240. The motion analysis unit 230 performs Step 140 shown in FIG. 1.

Figure 21:
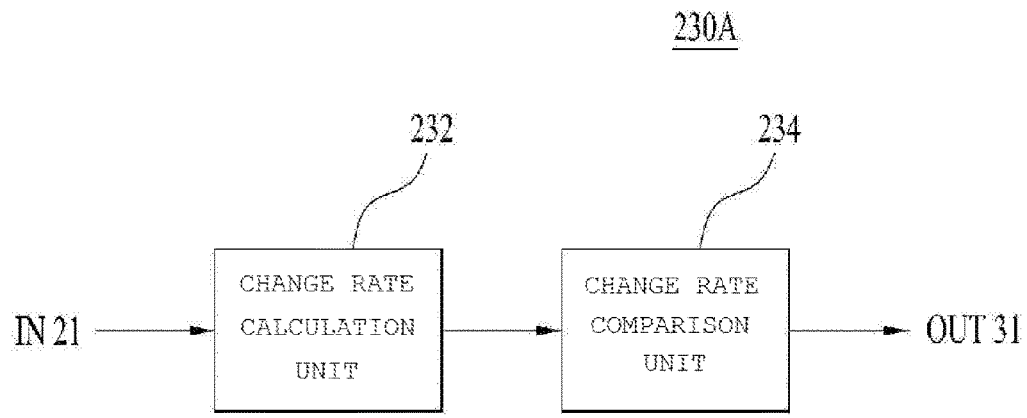
FIG. 21 is a block diagram showing an embodiment of a motion analysis unit shown in FIG. 17.

FIG. 21 is a block diagram showing an embodiment 230A of the motion analysis unit 230 shown in FIG. 17.

In this embodiment, the motion analysis unit 230A includes a change rate calculation unit 232 and a change rate comparison unit 234. The motion analysis unit 230A shown in FIG. 21 performs Step 140A shown in FIG. 13.

The change rate calculation unit 232 calculates the rate of change of the user's motion based on the motion image received from the image difference generation unit 320 through an input terminal IN21, and outputs the calculated change rate to the change rate comparison unit 234. The change rate calculation unit 232 performs Step 142 shown in FIG. 13.

The change rate comparison unit 234 compares the change rate, calculated by the change rate calculation unit 232, with a critical change rate, and outputs the result of comparison to the main controller 240 through an output terminal OUT31 as the result of analysis. The change rate comparison unit 234 performs Step 144 shown in FIG. 13.

Figure 22:
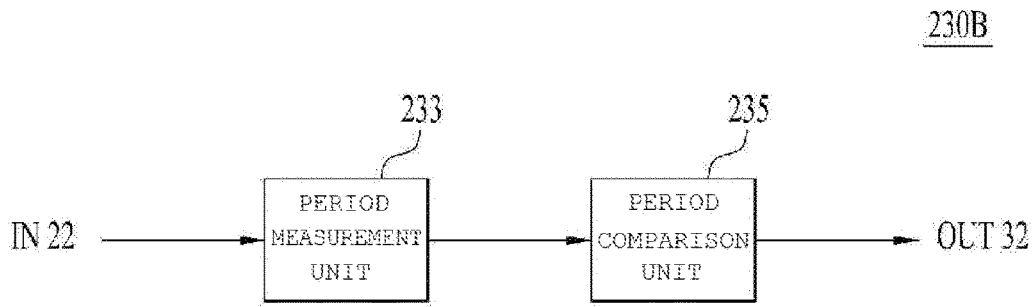
FIG. 22 is a block diagram showing another embodiment of the motion analysis unit shown in FIG. 17.

FIG. 22 is a block diagram showing another embodiment 230B of the motion analysis unit 230 shown in FIG. 17.

In this embodiment, the motion analysis unit 230B includes a period measurement unit 233 and a period comparison unit 235. The motion analysis unit 230B performs Step 140B shown in FIG. 16.

The period measurement unit 233 shown in FIG. 22 measures the period during which the user, having approached at least one certain point of the trunk 20, stays in place, and outputs the measured period to the period comparison unit 235. For example, the period measurement unit 233 may calculate the rate of change of the user's motion based on the motion image received from the image difference generation unit 320 through an input terminal IN22, and may measure the period during which the user, having approached the certain point of the trunk 20, stays in place based on the calculated change rate. The period measurement unit 233 performs Step 146 shown in FIG. 16.

The period comparison unit 235 determines whether the period measured by the period measurement unit 233 has exceeded the critical period, and outputs the result of determination to the main controller 240 through an output terminal OUT32 as the result of analysis. The period comparison unit 235 performs Step 148 shown in FIG. 16.

Figure 23:
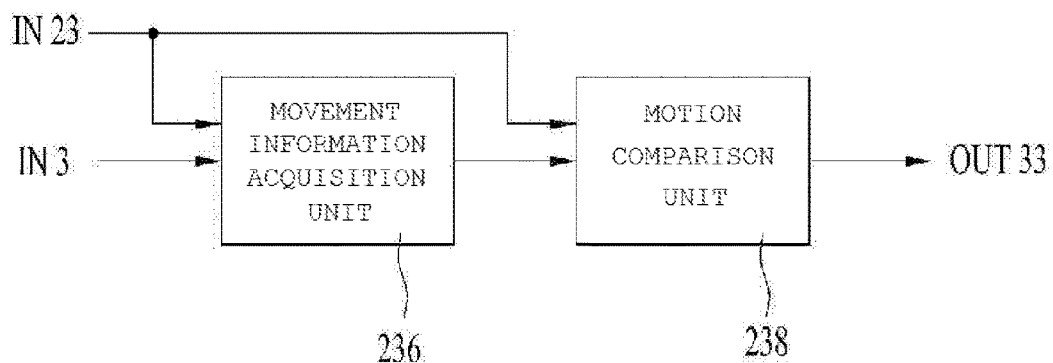
FIG. 23 is a block diagram showing a further embodiment of the motion analysis unit shown in FIG. 17.

FIG. 23 is a block diagram showing a still further embodiment 230C of the motion analysis unit 230 shown in FIG. 17.

The motion analysis unit 230C shown in FIG. 23 includes a movement information acquisition unit 236 and a motion comparison unit 238. The movement information acquisition unit 236 may acquire information about users' movement based on the user's motion information received from the motion information acquisition unit 220 through an input terminal IN23, or may acquire the movement information based on the location of the user recognized by the authentication and location recognition unit 212 through wireless communication with the wireless communication unit 44 held by the user and received through an input terminal IN3. Here, the movement information may include information about at least one selected from among whether the user is stationary, the speed of the user's movement, the speed at which the user approaches a certain point, the direction of the user's movement, and the speed at which the user approaches a certain point of the trunk 20.

The motion comparison unit 238 compares the user's motion with intentional motion based on the user's motion information received from the motion information acquisition unit 220 through the input terminal IN23 together with the movement information received from the movement information acquisition unit 236, and outputs the result of comparison to the main controller 240 through an output terminal OUT33 as the result of analysis. Here, information about intentional motion, which is compared with the user's motion, may be stored in the motion comparison unit 238, or may be provided from the outside. According to circumstances, the information about intentional motion may be updated.

Meanwhile, referring to FIG. 17, the trunk opening unit 250 opens the trunk 20 in response to an opening control signal output from the main controller 240. The trunk opening unit 250 performs Step 150 shown in FIG. 1. To this end, the main controller 240 may generate the opening control signal in response to the result of analysis by the motion analysis unit 230.

In addition, the alarm unit 280 may give a false alarm indicating that the trunk cannot be opened in response to the opening control signal from the main controller 240. The alarm unit 280 performs Step 160 shown in FIG. 1.

For example, upon determining that the user's motion is intentional motion based on the acquired user's motion information, the main controller 240 may generate a first-level opening control signal. Upon determining that the user's motion is not intentional motion, the main controller 240 may generate a second-level opening control signal.

In addition, the stationary state determination unit 260 determines whether the vehicle is stationary, and outputs the result of determination to the main controller 240. The stationary state determination unit 260 performs Step 120 shown in FIG. 1.

As previously described, Step 120 may be performed before Step 110, after Step 130 and before Step 140, or before Step 150.

In the case in which Step 120 is performed before Step 110, the main controller 240 generates an acquisition control signal only when the stationary state determination unit 260 determines that the vehicle is stationary.

In the case in which Step 120 is performed after Step 130 and before Step 140, the main controller 240 controls the power supply unit 270 with a first power control signal PC1 such that a fourth power P4 is supplied to the motion analysis unit 230, as will be described hereinafter, only when the stationary state determination unit 260 determines that the vehicle is stationary.

In the case in which Step 120 is performed before Step 150, the main controller 240 generates an opening control signal such that the trunk opening unit 250 opens the trunk 20 only when the stationary state determination unit 260 determines that the vehicle is stationary.

As described above, the main controller 240 may generate the acquisition control signal and the opening control signal in response to the result of determination by the stationary state determination unit 260.

In the following description, for the convenience of description, it is assumed that the stationary state determination unit 260 performs Step 120 shown in FIG. 1. However, embodiments are not limited thereto.

Figure 24:
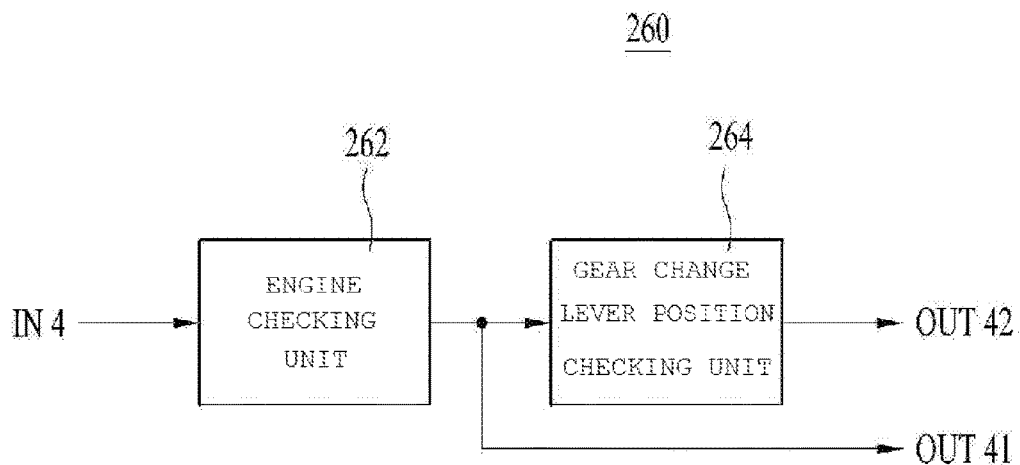
FIG. 24 is a block diagram showing an embodiment of a stationary state determination unit shown in FIG. 17.

FIG. 24 is a block diagram showing an embodiment of the stationary state determination unit 260 shown in FIG. 17.

The stationary state determination unit 260 shown in FIG. 24 performs Step 120 shown in FIG. 4. To this end, the stationary state determination unit 260 includes an engine checking unit 262 and a gear change lever position checking unit 264.

In response to a stationary state control signal received from the main controller 240 through an input terminal IN4, the engine checking unit 262 checks whether the engine of the vehicle is running, and outputs the result of checking to the main controller 240 through an output terminal OUT41. To this end, the main controller 240 generates the stationary state control signal upon determining that the user has approached the trunk based on the approach signal. The engine checking unit 262 performs Step 122 shown in FIG. 4.

Upon determining that the engine is running based on the result of checking by the engine checking unit 262, the gear change lever position checking unit 264 checks the position of the gear change lever of the vehicle, determines whether the engine is stationary in response to the result of checking, and outputs the result of determination to the main controller 240 through an output terminal OUT42. The gear change lever position checking unit 264 performs Step 124 shown in FIG. 4.

In other embodiments, the stationary state determination unit 260 may include only the engine checking unit 262, or may include only the gear change lever position checking unit 264, unlike what is shown in FIG. 24.

Meanwhile, the power supply unit 270 supplies power to the respective units 210, 220, 230, 240, 250, 260, and 270 shown in FIG. 17.

The power supply unit 270 may continuously supply first and second powers P1 and P2 to the approach determination unit 210 and the main controller 240.

In response to a first power control signal PC1 received from the main controller 240, the power supply unit 270 supplies third and fourth powers P3 and P4 to the motion information acquisition unit 220 and the motion analysis unit 230, respectively. The main controller 240 generates the first power control signal PC1 in response to the approach signal received from the approach determination unit 210. For example, upon determining that the user has approached the trunk based on the approach signal, the main controller 240 generates the first power control signal PC1 such that the third and fourth powers P3 and P4 are supplied from the power supply unit 270 to the motion information acquisition unit 220 and the motion analysis unit 230, respectively.

However, upon determining that the user has not approached the trunk, the main controller 240 generates the first power control signal PC1 such that the third and fourth powers P3 and P4 are not supplied from the power supply unit 270 to the motion information acquisition unit 220 and the motion analysis unit 230, respectively.

In addition, when the third power P3 is supplied to the motion information acquisition unit 220, the main controller 240 may perform control such that the light emitting unit 336 emits light and then the third power P3 is applied to the image photographing unit 310.

In addition, the power supply unit 270 supplies a fifth power P5 to the stationary state determination unit 260 in response to a second power control signal PC2. The main controller 240 generates the second power control signal PC2 in response to the approach signal. For example, upon determining that the user has approached the trunk based on the approach signal, the main controller 240 generates the second power control signal PC2 such that the fifth power P5 is supplied to the stationary state determination unit 260.

In addition, the power supply unit 270 supplies a sixth power P6 to the trunk opening unit 250 or a seventh power P7 to the alarm unit 280 in response to a third power control signal PC3. The main controller 240 generates the third power control signal PC3 in response to the opening control signal. For example, upon determining that the user's motion is intentional motion, the main controller 240 generates a first level third power control signal PC3. On the other hand, upon determining that the user's motion is not intentional motion, the main controller generates a second level third power control signal PC3. In this case, the power supply unit 270 supplies the sixth power P6 to the trunk opening unit 250 upon receiving a first-level opening control signal as the third power control signal PC3. In addition, the power supply unit 270 supplies the seventh power P7 to the alarm unit 280 upon receiving a second-level opening control signal as the third power control signal PC3.

The first and second powers P1 and P2 are continuously supplied from the power supply unit 270 to the approach determination unit 210 and the main controller 240, whereas power is supplied to the motion information acquisition unit 220, the motion analysis unit 230, the trunk opening unit 250, the stationary state determination unit 260, and the alarm unit 280 as needed under the control of the main controller 240. Consequently, the power consumption of the vehicle trunk opening device 200 shown in FIG. 17 may be reduced.

Generally, a vehicle has various electronic control unit (ECU). The ECU is a kind of computer containing software for executing various functions for the vehicle.

The vehicle trunk opening method and device according to the previous embodiments may be realized using an ECU having a trunk opening function.

Meanwhile, a recording medium containing a program for executing the vehicle trunk opening method 100, which is performed by the vehicle trunk opening device 200, records a program for realizing an approach determination function of determining whether the user has approached the trunk through the approach determination unit 210, an information acquisition function of acquiring user's motion information when the user approaches the trunk through the motion information acquisition unit 220, an analysis function of analyzing the acquired motion information to determine whether the user's motion is intentional motion performed with the intent of opening the trunk, and an opening function of opening the trunk 20 through the trunk opening unit 250 if the user's motion is intentional motion. The recording medium may be readable by a computer.

In addition, the computer-readable recording medium may record a program for further realizing a stationary state determination function of determining whether the vehicle is stationary.

In addition, the computer-readable recording medium may record a program for further realizing an alarm function of informing the user that the trunk cannot be opened upon determining that the user's motion is not intentional motion.

The approach determination function includes a function of authenticating the user and recognizing the location of the user through wireless communication with the wireless communication unit held by the user, a function of calculating the separation distance between the trunk and the user based on the recognized location of the user, and a function of determining whether the separation distance is equal to or less than a critical distance. The information acquisition function may be performed when the separation distance is equal to or less than the critical distance.

The information acquisition function includes a function of, when the user has approached the trunk but is not yet located in front of the trunk, photographing the state in front of the trunk that does not contain user's motion and acquiring the photographed image as a first image, a function of, when the user, having approached the trunk, is located in front of the trunk, photographing the state in front of the trunk that contains user's motion and acquiring the photographed image as a second image, and a function of acquiring the difference between the first image and the second image as a motion image. The information acquisition function may further include a function of sensing illumination intensity around the trunk and a function of turning the light emitting unit on or off such that the light emitting unit emits or does not emit light to the front of the trunk based on the sensed illumination intensity.

Alternatively, the information acquisition function may include a function of transmitting a signal toward the front of the trunk, a function of receiving a signal reflected by the body of the user, and a function of acquiring user's motion information based on the transmitted signal and the received signal.

The analysis function includes a change rate calculation function of calculating the rate of change of the user's motion from the motion image and a change rate determination function of determining whether the calculated change rate is equal to or greater than a critical change rate.

The change rate calculation function includes a function of calculating the change rate of the luminance level of a plurality of pixels in the center area of each of a plurality of frames as a first position luminance change rate and a function of calculating the change rate of the luminance level of a plurality of pixels in the peripheral area of each of the frames as a second position luminance change rate. The change rate determination function compares the first and second position luminance change rates with a critical change rate.

The analysis function includes a function of measuring the period during which the user, having approached at least one certain point of the trunk, stays in place based on the acquired motion information and a function of determining whether the measured period exceeds a critical period. Upon determining that the measured period does not exceed a critical period, the trunk is opened.

The analysis function includes a function of acquiring user's movement information based on the acquired motion information. It is possible to determine whether the user's motion is intentional motion by referring to the movement information.

The stationary state determination function includes a function of checking whether the engine of the vehicle is running and determining whether the vehicle is stationary based on the result of checking.

The stationary state determination function includes a function of checking the position of the gear change lever of the vehicle and determining whether the vehicle is stationary based on the result of checking.

The computer-readable recording medium includes all kinds of storage devices for storing data that can be read by a computer system. Examples of the computer-readable recording medium may include a read only memory (ROM), a random access memory (RAM), a compact disc read only memory (CD-ROM), a magnetic tape, a floppy disk, and an optical data storage device. In addition, the computer-readable recording medium may also be realized in the form of a carrier wave (for example, transmission over the Internet). In addition, the computer-readable recording medium may be distributed to computer systems connected to each other through a network such that code readable by the computer is stored or executed in a distributed mode. In addition, a functional program, code, and code segments for embodying the vehicle trunk opening method may be easily reasoned by programmers in the art to which the disclosure pertains.

In a conventional vehicle trunk opening method, the trunk is not opened through an image or using an infrared signal or an ultrasonic signal. As a result, when a dog or a cat passes below the sensor of the vehicle, the trunk may be frequently opened.

In the vehicle trunk opening method and device and the computer-readable recording medium according to the embodiments recording the program for executing the method, however, the motion of a user who intends to open the trunk is determined using an image or an infrared or ultrasonic signal, and the trunk is opened based on the result of determination. Consequently, the above-mentioned problem does not occur, and it is possible for the user to easily open the trunk through the user's motion, such as a gesture.

In addition, a smart key system for vehicles, which was introduced in 1999, has been widely used to date. Consequently, the above-described embodiments may use the smart key system as the approach determination unit 210. In addition, the above-described embodiments may use a conventional rear monitoring camera or a camera for an around view system as the image photographing unit 310. That is, members mounted in conventional vehicles may be used, whereby the vehicle trunk opening method and device may be easily realized at low cost.

In addition, according to the embodiments, information about the user's motion is acquired using an image or an infrared or ultrasonic signal, and the trunk is opened based on the acquired information. Consequently, it is possible to prevent the trunk from being unintentionally opened by animals or foreign matter.

In addition, the trunk is opened after user authentication. Consequently, it is possible to prevent the trunk from being opened by an unauthorized person, which may be familiar with the intentional motion.

In addition, the second image is acquired only when the user has approached a certain point of the trunk such that the person is within the predetermined distance d inside the bumper of the vehicle, as shown in FIG. 2A. In the case in which the predetermined distance d is set to be inside the bumper of the vehicle, it is possible to prevent the trunk from being unintentionally opened by the approaching of another person who is not located near the trunk. The reason for this is that there is a low probability that another person will approach inside the bumper.

Additionally, in the above-described embodiments, the trunk is opened using the luminance level change rate of the pixels. Consequently, it is possible to prevent the trunk from being opened unintentionally even when the user, not intending to open the trunk, or another person has reached a certain point of the trunk so as to be within the predetermined distance d in order to lean against the trunk. Thus, the trunk is not open only by the close approaching of the user or another person.

In addition, it is possible to open the trunk through the user's gesture without contacting the vehicle or the accessory of the vehicle (for example, a remote control key of the vehicle having a trunk opening button). That is, the trunk may be opened in a non-contact fashion.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

MODE FOR INVENTION

Various embodiments have been described in the best mode for carrying out the invention.

INDUSTRIAL APPLICABILITY

The vehicle trunk opening method and device according to the embodiments and the recording medium containing the program for executing the method are applicable to a vehicle.

The invention claimed is:
1. A device for opening a trunk of a vehicle, comprising:
a camera; and
a controller configured to:
determine whether a user has approached the trunk of the vehicle through wireless communication with a wireless communication unit held by the user and output a result of the determination as an approach signal, including:

authenticate the user and recognize a location of the user through wireless communication with the wireless communication unit held by the user, calculate a separation distance between the trunk and the user based on the recognized location, and compare the calculated distance with a critical distance and output a result of the comparison as the approach signal, acquire information about motion of the user when the vehicle is stationary by the camera, wherein the camera is configured to photograph a state in front of the trunk that does not contain a user's motion in response to a first level acquisition control signal and output the photographed image as a first image, and photograph a state in front of the trunk that contains the user's motion in response to a second level acquisition control signal and output the photographed image as a second image, and to output a motion image, which is a difference between the second image and the first image, as the user's motion information, analyze the acquired motion information to determine whether the user's motion is intentional motion performed with an intent of opening the trunk and output a result of the analysis, generate an opening control signal in response to the result of the analysis to open the trunk, calculate a change rate of the user's motion based on the motion image, the calculated change rate comprising a change rate of a pixel luminance level between adjacent frames, among a plurality of frames in the motion image, compare the calculated change rate with a critical change rate and outputting a result of comparison as the result of analysis, wherein the controller generates the first level acquisition control signal upon determining that the user, having approached the trunk, is not yet located in front of the trunk based on the approach signal, and generates the second level acquisition control signal upon determining that the user, having approached the trunk, is located in front of the trunk based on the approach signal.

2. The device according to claim 1, wherein the device further comprises:
a light emitting unit configured to emit light in response to a light emission control signal,
an illumination sensor configured to sense illumination intensity around the trunk, and
a lighting controller configured to control the light emission control signal in response to the sensed illumination intensity.

3. The device according to claim 1, wherein the controller is further configured to:
transmit a signal toward the front of the trunk,
receive a signal reflected by a body of the user, and
process the transmitted signal and the received signal to acquire the user's motion information.

4. The device according to claim 1, wherein the controller is further configured to:
determine whether the vehicle is stationary, and
generate the first and second level acquisition control signals and the opening control signal in response to a result of determination.

5. The device according to claim 4, further comprising a power supply unit configured to supply power in response to a first power control signal, wherein the controller generates the first power control signal in response to the approach signal.

6. A method of opening a trunk of a vehicle, the method comprising:
(a) determining whether a user has approached the trunk of the vehicle through wireless communication with a wireless communication unit held by the user, including:
authenticating the user and recognizing a location of the user through wireless communication with the wireless communication unit held by the user;
calculating a separation distance between the trunk and the user based on the recognized location; and
determining whether the separation distance is equal to or less than a critical distance;
(b) acquiring information about motion of the user when the vehicle is stationary, and upon determining that the user has approached the trunk;
(c) analyzing the motion information to determine whether the user's motion is a predetermined intentional motion performed with an intent of opening the trunk; and
(d) opening the trunk upon determining that the user's motion is the predetermined intentional motion,
wherein step (a) comprises:
photographing a state in front of the trunk that does not contain the user's motion and acquiring the photographed image as a first image when the user, having approached the trunk, is not yet located in front of the trunk;
photographing a state in front of the trunk that contains the user's motion and acquiring the photographed image as a second image when the user, having approached the trunk, is located in front of the trunk; and
acquiring a difference between the first image and the second image as a motion image,
wherein step (c) comprises:
(c1) calculating a change rate of the user's motion based on the motion image, and
(c2) determining whether the calculated change rate is equal to or greater than a critical change rate,
wherein the change rate calculated at step (c1) comprises a change rate of a pixel luminance level between adjacent frames, among a plurality of frames in the motion image,
wherein step (b) is performed upon determining that the separation distance is equal to or less than the critical distance,
wherein step (c) comprises determining whether the user's motion is the predetermined intentional motion using the motion image.

7. The method according to claim 6, wherein step (b) further comprises:
sensing illumination intensity around the trunk; and
turning on or off a light emitting unit that emits light toward a front of the trunk based on the sensed illumination intensity.

8. The method according to claim 6, wherein step (b) comprises:
transmitting a signal toward a front of the trunk;
receiving a signal reflected by a body of the user; and
processing the transmitted signal and the received signal to acquire the user's motion information.

9. The method according to claim 8, wherein step (c) comprises:
  measuring a period during which the user, having approached at least one certain point of the trunk, stays in place based on the acquired motion information; and
  determining whether the measured period exceeds a critical period,
  wherein step (d) comprises opening the trunk upon determining that the measured period does not exceed the critical period.

10. The method according to claim 6, wherein step (d) comprises opening the trunk upon determining that the calculated change rate is equal to or greater than the critical change rate.

11. The method according to claim 10, wherein step (c1) comprises:
  (c11) calculating a change rate of the luminance level of a plurality of pixels in a center area of each of the frames as a first position luminance change rate; and
  (c12) calculating a change rate of the luminance level of a plurality of pixels in a peripheral area of each of the frames as a second position luminance change rate.

12. A non-statutory computer readable medium comprising a program for executing a vehicle trunk opening method performed by a vehicle trunk opening device comprising a camera and a controller, wherein the program is configured to:
  execute the controller to determine whether the user has approached the trunk of the vehicle through wireless communication with a wireless communication unit held by the user, including:
    authenticate the user and recognize a location of the user through wireless communication with the wireless communication unit held by the user,
    calculate a separation distance between the trunk and the user based on the recognized location, and
    compare the calculated distance with a critical distance and output a result of the comparison as the approach signal,
  execute the camera to acquire information about motion of the user upon determining that the user has approached the trunk and when the vehicle is stationary, wherein the camera is executed to photograph a state in front of the trunk that does not contain a user's motion in response to a first level acquisition control signal and output the photographed image as a first image, and photograph a state in front of the trunk that contains the user's motion in response to a second level acquisition control signal and output the photographed image as a second image, and to output a motion image, which is a difference between the second image and the first image, as the user's motion information,
  calculate a change rate of the user's motion based on the motion image, the calculated change rate comprising a change rate of a pixel luminance level between adjacent frames, among a plurality of frames in the motion image,
  compare the calculated change rate with a critical change rate and outputting a result of comparison as the result of analysis,
  execute the controller to analyze the acquired motion information to determine whether the user's motion is a predetermined intentional motion performed with an intent of opening the trunk, and
  execute the controller to open the trunk through the trunk opening unit upon determining that the user's motion is the predetermined intentional motion,
  wherein the controller generates the first level acquisition control signal upon determining that the user, having approached the trunk, is not yet located in front of the trunk based on the approach signal, and generates the second level acquisition control signal upon determining that the user, having approached the trunk, is located in front of the trunk based on the approach signal.

* * * * *